US012300920B2

(12) United States Patent
Fan et al.

(10) Patent No.: US 12,300,920 B2
(45) Date of Patent: May 13, 2025

(54) HIGH PERFORMANCE CARD EDGE CONNECTOR FOR HIGH BANDWIDTH TRANSMISSION

(71) Applicant: Amphenol Commercial Products (Chengdu) Co., Ltd., Chengdu (CN)

(72) Inventors: Jun Fan, Chengdu (CN); Tao Zeng, Chengdu (CN); Ki Ka Lau, Kowloon (HK)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 301 days.

(21) Appl. No.: 17/863,182

(22) Filed: Jul. 12, 2022

(65) Prior Publication Data

US 2023/0049560 A1 Feb. 16, 2023

(30) Foreign Application Priority Data

Aug. 13, 2021 (CN) ........................ 202121908685.1

(51) Int. Cl.
*H01R 12/72* (2011.01)
*H01R 13/24* (2006.01)
(Continued)

(52) U.S. Cl.
CPC ........... *H01R 12/721* (2013.01); *H01R 13/24* (2013.01); *H01R 13/40* (2013.01); *H01R 13/516* (2013.01)

(58) Field of Classification Search
CPC . H01R 12/721; H01R 12/737; H01R 13/6585
See application file for complete search history.

(56) References Cited

U.S. PATENT DOCUMENTS 2,996,710 A 8/1961 Pratt
3,002,162 A 9/1961 Garstang
(Continued)

FOREIGN PATENT DOCUMENTS

CN 1075390 A 8/1993
CN 1098549 A 2/1995
(Continued)

OTHER PUBLICATIONS

CN 200580040906.5, Aug. 17, 2021, Chinese Invalidation Request.
(Continued)

*Primary Examiner* — Oscar C Jimenez
(74) *Attorney, Agent, or Firm* — Wolf, Greenfield & Sacks, P.C.

(57) ABSTRACT

A card edge connector for high bandwidth transmission. The connector may include a housing having a groove between two walls. The walls may include slots holding terminals of the connector. The terminals of the connector may each include a mating contact portion, a mounting contact portion opposite the mating contact portion, a bearing portion extending from the mounting contact portion and fixed in the housing, and a beam extending from the bearing portion. The beams may be configured to flex when the mating contact portions make contact with pads on a card. The terminals may each include a curved transition portion between the mating contact portion and the beam so as to prevent the beam from touching the card. The housing may include holes through the walls between mating contact portions of selected adjacent terminals. Such a configuration reduces impedance mismatch at the mating interface and therefore improve signal integrity.

20 Claims, 8 Drawing Sheets

(51) Int. Cl.
*H01R 13/40* (2006.01)
*H01R 13/516* (2006.01)

(56) References Cited

U.S. PATENT DOCUMENTS 3,134,950 A 5/1964 Cook
3,243,756 A 3/1966 Ruete et al.
3,322,885 A 5/1967 May et al.
3,390,369 A 6/1968 Zavertnik et al.
3,390,389 A 6/1968 Bluish
3,505,619 A 4/1970 Bishop
3,530,422 A 9/1970 Goodman
3,573,677 A 4/1971 Detar
3,631,381 A 12/1971 Pittman
3,731,259 A 5/1973 Occhipinti
3,743,978 A 7/1973 Fritz
3,745,509 A 7/1973 Woodward et al.
3,786,372 A 1/1974 Epis et al.
3,825,874 A 7/1974 Peverill
3,848,073 A 11/1974 Simons et al.
3,863,181 A 1/1975 Glance et al.
3,977,757 A 8/1976 Yurtin
3,999,830 A 12/1976 Herrmann, Jr. et al.
4,155,613 A 5/1979 Brandeau
4,175,821 A 11/1979 Hunter
4,195,272 A 3/1980 Boutros
4,215,910 A 8/1980 Walter
4,272,148 A 6/1981 Knack, Jr.
4,276,523 A 6/1981 Boutros et al.
4,286,837 A 9/1981 Yasutake et al.
4,371,742 A 2/1983 Manly
4,408,255 A 10/1983 Adkins
4,447,105 A 5/1984 Ruehl
4,457,576 A 7/1984 Cosmos et al.
4,471,015 A 9/1984 Ebneth et al.
4,472,765 A 9/1984 Hughes
4,484,159 A 11/1984 Whitley
4,490,283 A 12/1984 Kleiner
4,518,651 A 5/1985 Wolfe, Jr.
4,519,664 A 5/1985 Tillotson
4,519,665 A 5/1985 Althouse et al.
4,571,014 A 2/1986 Robin et al.
4,605,914 A 8/1986 Harman
4,607,907 A 8/1986 Bogursky
4,632,476 A 12/1986 Schell
4,636,752 A 1/1987 Saito
4,655,518 A 4/1987 Johnson et al.
4,674,812 A 6/1987 Thom et al.
4,678,260 A 7/1987 Gallusser et al.
4,682,129 A 7/1987 Bakermans et al.
4,686,607 A 8/1987 Johnson
4,687,267 A 8/1987 Header et al.
4,728,762 A 3/1988 Roth et al.
4,737,598 A 4/1988 O'Connor
4,751,479 A 6/1988 Parr
4,761,147 A 8/1988 Gauthier
4,787,548 A 11/1988 Abbagnaro et al.
4,806,107 A 2/1989 Arnold et al.
4,824,383 A 4/1989 Lemke
4,836,791 A 6/1989 Grabbe et al.
4,846,724 A 7/1989 Sasaki et al.
4,846,727 A 7/1989 Glover et al.
4,871,316 A 10/1989 Herrell et al.
4,876,630 A 10/1989 Dara
4,878,155 A 10/1989 Conley
4,889,500 A 12/1989 Lazar et al.
4,902,243 A 2/1990 Davis
4,948,922 A 8/1990 Varadan et al.
4,970,354 A 11/1990 Iwasa et al.
4,971,726 A 11/1990 Maeno et al.
4,975,084 A 12/1990 Fedder et al.
4,984,992 A 1/1991 Beamenderfer et al.
4,992,060 A 2/1991 Meyer
5,000,700 A 3/1991 Masubuchi et al.
5,041,023 A 8/1991 Lytle
5,046,084 A 9/1991 Barrett et al.
5,046,952 A 9/1991 Cohen et al.
5,046,960 A 9/1991 Fedder
5,066,236 A 11/1991 Broeksteeg
5,135,405 A 8/1992 Fusselman et al.
5,141,454 A 8/1992 Garrett et al.
5,150,086 A 9/1992 Ito
5,166,527 A 11/1992 Solymar
5,168,252 A 12/1992 Naito
5,168,432 A 12/1992 Murphy et al.
5,171,161 A 12/1992 Kachlic
5,176,538 A 1/1993 Hansell, III et al.
5,190,472 A 3/1993 Voltz et al.
5,246,388 A 9/1993 Collins et al.
5,259,773 A 11/1993 Champion et al.
5,266,055 A 11/1993 Naito et al.
5,280,257 A 1/1994 Cravens et al.
5,281,762 A 1/1994 Long et al.
5,287,076 A 2/1994 Johnescu et al.
5,323,299 A 6/1994 Weber
5,334,050 A 8/1994 Andrews
5,335,146 A 8/1994 Stucke
5,340,334 A 8/1994 Nguyen
5,346,410 A 9/1994 Moore, Jr.
5,352,123 A 10/1994 Sample et al.
5,403,206 A 4/1995 McNamara et al.
5,407,622 A 4/1995 Cleveland et al.
5,429,520 A 7/1995 Morlion et al.
5,429,521 A 7/1995 Morlion et al.
5,433,617 A 7/1995 Morlion et al.
5,433,618 A 7/1995 Morlion et al.
5,456,619 A 10/1995 Belopolsky et al.
5,461,392 A 10/1995 Mott et al.
5,474,472 A 12/1995 Niwa et al.
5,484,310 A 1/1996 McNamara et al.
5,490,372 A 2/1996 Schlueter
5,496,183 A 3/1996 Soes et al.
5,499,935 A 3/1996 Powell
5,539,148 A 7/1996 Konishi et al.
5,551,893 A 9/1996 Johnson
5,554,050 A 9/1996 Marpoe, Jr.
5,562,497 A 10/1996 Yagi et al.
5,564,949 A 10/1996 Wellinsky
5,571,991 A 11/1996 Highum et al.
5,597,328 A 1/1997 Mouissie
5,605,469 A 2/1997 Wellinsky et al.
5,620,340 A 4/1997 Andrews
5,651,702 A 7/1997 Hanning et al.
5,660,551 A 8/1997 Sakurai
5,669,789 A 9/1997 Law
5,702,258 A 12/1997 Provencher et al.
5,755,597 A 5/1998 Panis et al.
5,795,191 A 8/1998 Preputnick et al.
5,796,323 A 8/1998 Uchikoba et al.
5,803,768 A 9/1998 Zell et al.
5,831,491 A 11/1998 Buer et al.
5,833,486 A 11/1998 Shinozaki
5,833,496 A 11/1998 Hollander et al.
5,842,887 A 12/1998 Andrews
5,870,528 A 2/1999 Fukuda
5,885,088 A 3/1999 Brennan et al.
5,885,095 A 3/1999 Cohen et al.
5,887,158 A 3/1999 Sample et al.
5,904,594 A 5/1999 Longueville et al.
5,924,899 A 7/1999 Paagman
5,931,686 A 8/1999 Sasaki et al.
5,959,591 A 9/1999 Aurand
5,961,355 A 10/1999 Morlion et al.
5,971,809 A 10/1999 Ho
5,980,321 A 11/1999 Cohen et al.
5,981,869 A 11/1999 Kroger
5,982,253 A 11/1999 Perrin et al.
5,993,259 A 11/1999 Stokoe et al.
5,997,361 A 12/1999 Driscoll et al.
6,019,616 A 2/2000 Yagi et al.
6,042,394 A 3/2000 Mitra et al.
6,083,047 A 7/2000 Paagman
6,102,747 A 8/2000 Paagman
6,116,926 A 9/2000 Ortega et al.

(56) References Cited

U.S. PATENT DOCUMENTS

| | | | |
|---|---|---|---|
| 6,120,306 | A | 9/2000 | Evans |
| 6,123,554 | A | 9/2000 | Ortega et al. |
| 6,132,255 | A | 10/2000 | Verhoeven |
| 6,132,355 | A | 10/2000 | Derie |
| 6,135,824 | A | 10/2000 | Okabe et al. |
| 6,146,202 | A | 11/2000 | Ramey et al. |
| 6,152,274 | A | 11/2000 | Blard et al. |
| 6,152,742 | A | 11/2000 | Cohen et al. |
| 6,152,747 | A | 11/2000 | McNamara |
| 6,163,464 | A | 12/2000 | Ishibashi et al. |
| 6,168,469 | B1 | 1/2001 | Lu |
| 6,171,115 | B1 | 1/2001 | Mickievicz et al. |
| 6,171,149 | B1 | 1/2001 | van Zanten |
| 6,174,202 | B1 | 1/2001 | Mitra |
| 6,174,203 | B1 | 1/2001 | Asao |
| 6,174,944 | B1 | 1/2001 | Chiba et al. |
| 6,179,651 | B1 | 1/2001 | Huang |
| 6,179,663 | B1 | 1/2001 | Bradley et al. |
| 6,196,853 | B1 | 3/2001 | Harting et al. |
| 6,203,396 | B1 | 3/2001 | Asmussen et al. |
| 6,206,729 | B1 | 3/2001 | Bradley et al. |
| 6,210,182 | B1 | 4/2001 | Elco et al. |
| 6,210,227 | B1 | 4/2001 | Yamasaki et al. |
| 6,217,372 | B1 | 4/2001 | Reed |
| 6,227,875 | B1 | 5/2001 | Wu et al. |
| 6,231,391 | B1 | 5/2001 | Ramey et al. |
| 6,238,245 | B1 | 5/2001 | Stokoe et al. |
| 6,267,604 | B1 | 7/2001 | Mickievicz et al. |
| 6,273,758 | B1 | 8/2001 | Lloyd et al. |
| 6,293,827 | B1 | 9/2001 | Stokoe |
| 6,296,491 | B1 | 10/2001 | Pickles |
| 6,296,496 | B1 | 10/2001 | Trammel |
| 6,299,438 | B1 | 10/2001 | Sahagian et al. |
| 6,299,483 | B1 | 10/2001 | Cohen et al. |
| 6,299,484 | B2 | 10/2001 | Van Woensel |
| 6,299,492 | B1 | 10/2001 | Pierini et al. |
| 6,315,615 | B1 | 11/2001 | Raistrick |
| 6,322,395 | B1 | 11/2001 | Nishio et al. |
| 6,328,572 | B1 | 12/2001 | Higashida et al. |
| 6,328,601 | B1 | 12/2001 | Yip et al. |
| 6,333,468 | B1 | 12/2001 | Endoh et al. |
| 6,343,955 | B2 | 2/2002 | Billman et al. |
| 6,343,957 | B1 | 2/2002 | Kuo et al. |
| 6,347,962 | B1 | 2/2002 | Kline |
| 6,350,134 | B1 | 2/2002 | Fogg et al. |
| 6,358,088 | B1 | 3/2002 | Nishio et al. |
| 6,358,092 | B1 | 3/2002 | Siemon et al. |
| 6,361,363 | B1 | 3/2002 | Hwang |
| 6,364,711 | B1 | 4/2002 | Berg et al. |
| 6,364,713 | B1 | 4/2002 | Kuo |
| 6,375,510 | B2 | 4/2002 | Asao |
| 6,379,188 | B1 | 4/2002 | Cohen et al. |
| 6,380,485 | B1 | 4/2002 | Beaman et al. |
| 6,392,142 | B1 | 5/2002 | Uzuka et al. |
| 6,394,839 | B2 | 5/2002 | Reed |
| 6,394,842 | B1 | 5/2002 | Sakurai et al. |
| 6,396,712 | B1 | 5/2002 | Kuijk |
| 6,398,588 | B1 | 6/2002 | Bickford |
| 6,409,543 | B1 | 6/2002 | Astbury, Jr. et al. |
| 6,413,119 | B1 | 7/2002 | Gabrisko, Jr. et al. |
| 6,428,344 | B1 | 8/2002 | Reed |
| 6,431,914 | B1 | 8/2002 | Billman |
| 6,435,913 | B1 | 8/2002 | Billman |
| 6,435,914 | B1 | 8/2002 | Billman |
| 6,441,313 | B1 | 8/2002 | Novak |
| 6,447,170 | B1 | 9/2002 | Takahashi et al. |
| 6,454,605 | B1 | 9/2002 | Bassler et al. |
| 6,461,202 | B2 | 10/2002 | Kline |
| 6,471,549 | B1 | 10/2002 | Lappohn |
| 6,478,624 | B2 | 11/2002 | Ramey et al. |
| 6,482,017 | B1 | 11/2002 | Van Doorn |
| 6,491,545 | B1 | 12/2002 | Spiegel et al. |
| 6,503,103 | B1 | 1/2003 | Cohen et al. |
| 6,506,076 | B2 | 1/2003 | Cohen et al. |
| 6,517,360 | B1 | 2/2003 | Cohen |
| 6,520,803 | B1 | 2/2003 | Dunn |
| 6,527,587 | B1 | 3/2003 | Ortega et al. |
| 6,528,737 | B1 | 3/2003 | Kwong et al. |
| 6,530,790 | B1 | 3/2003 | McNamara et al. |
| 6,533,613 | B1 | 3/2003 | Turner et al. |
| 6,537,087 | B2 | 3/2003 | McNamara et al. |
| 6,538,524 | B1 | 3/2003 | Miller |
| 6,538,899 | B1 | 3/2003 | Krishnamurthi et al. |
| 6,540,522 | B2 | 4/2003 | Sipe |
| 6,540,558 | B1 | 4/2003 | Paagman |
| 6,540,559 | B1 | 4/2003 | Kemmick et al. |
| 6,541,712 | B1 | 4/2003 | Gately et al. |
| 6,544,072 | B2 | 4/2003 | Olson |
| 6,544,647 | B1 | 4/2003 | Hayashi et al. |
| 6,551,140 | B2 | 4/2003 | Billman et al. |
| 6,554,647 | B1 | 4/2003 | Cohen et al. |
| 6,565,387 | B2 | 5/2003 | Cohen |
| 6,565,390 | B2 | 5/2003 | Wu |
| 6,579,116 | B2 | 6/2003 | Brennan et al. |
| 6,582,244 | B2 | 6/2003 | Fogg et al. |
| 6,585,540 | B2 | 7/2003 | Gutierrez et al. |
| 6,592,381 | B2 | 7/2003 | Cohen et al. |
| 6,595,801 | B1 | 7/2003 | Leonard et al. |
| 6,595,802 | B1 | 7/2003 | Watanabe et al. |
| 6,602,095 | B2 | 8/2003 | Astbury, Jr. et al. |
| 6,607,402 | B2 | 8/2003 | Cohen et al. |
| 6,608,762 | B2 | 8/2003 | Patriche |
| 6,609,922 | B2 | 8/2003 | Torii |
| 6,609,933 | B2 | 8/2003 | Yamasaki |
| 6,612,871 | B1 | 9/2003 | Givens |
| 6,616,482 | B2 | 9/2003 | De La Cruz et al. |
| 6,616,864 | B1 | 9/2003 | Jiang et al. |
| 6,621,373 | B1 | 9/2003 | Mullen et al. |
| 6,652,318 | B1 | 11/2003 | Winings et al. |
| 6,652,319 | B1 | 11/2003 | Billman |
| 6,655,966 | B2 | 12/2003 | Rothermel et al. |
| 6,663,427 | B1 | 12/2003 | Billman et al. |
| 6,663,429 | B1 | 12/2003 | Korsunsky et al. |
| 6,692,272 | B2 | 2/2004 | Lemke et al. |
| 6,705,895 | B2 | 3/2004 | Hasircoglu |
| 6,706,974 | B2 | 3/2004 | Chen et al. |
| 6,709,294 | B1 | 3/2004 | Cohen et al. |
| 6,712,648 | B2 | 3/2004 | Padro et al. |
| 6,713,672 | B1 | 3/2004 | Stickney |
| 6,717,825 | B2 | 4/2004 | Volstorf |
| 6,722,897 | B1 | 4/2004 | Wu |
| 6,726,492 | B1 | 4/2004 | Yu |
| 6,741,141 | B2 | 5/2004 | Kormanyos |
| 6,743,057 | B2 | 6/2004 | Davis et al. |
| 6,749,444 | B2 | 6/2004 | Murr et al. |
| 6,762,941 | B2 | 7/2004 | Roth |
| 6,764,341 | B2 | 7/2004 | Lappoehn |
| 6,776,645 | B2 | 8/2004 | Roth et al. |
| 6,776,659 | B1 | 8/2004 | Stokoe et al. |
| 6,786,771 | B2 | 9/2004 | Gailus |
| 6,792,941 | B2 | 9/2004 | Andersson |
| 6,806,109 | B2 | 10/2004 | Furuya et al. |
| 6,808,419 | B1 | 10/2004 | Korsunsky et al. |
| 6,808,420 | B2 | 10/2004 | Whiteman, Jr. et al. |
| 6,814,519 | B2 | 11/2004 | Policicchio et al. |
| 6,814,619 | B1 | 11/2004 | Stokoe et al. |
| 6,816,486 | B1 | 11/2004 | Rogers |
| 6,817,870 | B1 | 11/2004 | Kwong et al. |
| 6,823,587 | B2 | 11/2004 | Reed |
| 6,830,478 | B1 | 12/2004 | Ko et al. |
| 6,830,483 | B1 | 12/2004 | Wu |
| 6,830,489 | B2 | 12/2004 | Aoyama |
| 6,857,899 | B2 | 2/2005 | Reed et al. |
| 6,872,085 | B1 | 3/2005 | Cohen et al. |
| 6,875,031 | B1 | 4/2005 | Korsunsky et al. |
| 6,899,566 | B2 | 5/2005 | Kline et al. |
| 6,903,939 | B1 | 6/2005 | Chea, Jr. et al. |
| 6,913,490 | B2 | 7/2005 | Whiteman, Jr. et al. |
| 6,932,649 | B1 | 8/2005 | Rothermel et al. |
| 6,957,967 | B2 | 10/2005 | Petersen et al. |
| 6,960,103 | B2 | 11/2005 | Tokunaga |
| 6,971,916 | B2 | 12/2005 | Tokunaga |
| 6,979,202 | B2 | 12/2005 | Benham et al. |
| 6,979,226 | B2 | 12/2005 | Otsu et al. |

(56) References Cited

U.S. PATENT DOCUMENTS 6,982,378 B2 1/2006 Dickson
6,986,681 B2 1/2006 Tsai
7,004,793 B2 2/2006 Scherer et al.
7,021,969 B2 4/2006 Matsunaga
7,044,794 B2 5/2006 Consoli et al.
7,057,570 B2 6/2006 Irion, II et al.
7,074,086 B2 7/2006 Cohen et al.
7,086,872 B2 8/2006 Myer et al.
7,094,102 B2 8/2006 Cohen et al.
7,104,842 B1 9/2006 Huang et al.
7,108,556 B2 9/2006 Cohen et al.
7,120,327 B2 10/2006 Bozso et al.
7,137,849 B2 11/2006 Nagata
7,156,672 B2 1/2007 Fromm et al.
7,163,421 B1 1/2007 Cohen et al.
7,182,643 B2 2/2007 Winings et al.
7,229,318 B2 6/2007 Winings et al.
7,232,344 B1 6/2007 Gillespie et al.
7,261,591 B2 8/2007 Korsunsky et al.
7,270,573 B2 9/2007 Houtz
7,285,018 B2 10/2007 Kenny et al.
7,303,427 B2 12/2007 Swain
7,309,239 B2 12/2007 Shuey et al.
7,309,257 B1 12/2007 Minich
7,316,585 B2 1/2008 Smith et al.
7,318,740 B1 1/2008 Henry et al.
7,320,614 B2 1/2008 Toda et al.
7,322,845 B2 1/2008 Regnier et al.
7,322,855 B2 1/2008 Mongold et al.
7,331,822 B2 2/2008 Chen
7,331,830 B2 2/2008 Minich
7,335,063 B2 2/2008 Cohen et al.
7,347,721 B2 3/2008 Kameyama
7,351,114 B2 4/2008 Benham et al.
7,354,274 B2 4/2008 Minich
7,364,464 B2 4/2008 Iino et al.
7,365,269 B2 4/2008 Donazzi et al.
7,371,117 B2 5/2008 Gailus
7,390,218 B2 6/2008 Smith et al.
7,390,220 B1 6/2008 Wu
7,407,413 B2 8/2008 Minich
7,467,977 B1 12/2008 Yi et al.
7,473,124 B1 1/2009 Briant et al.
7,494,383 B2 2/2009 Cohen et al.
7,540,781 B2 6/2009 Kenny et al.
7,554,096 B2 6/2009 Ward et al.
7,581,990 B2 9/2009 Kirk et al.
7,585,186 B2 9/2009 McAlonis et al.
7,588,464 B2 9/2009 Kim
7,588,467 B2 9/2009 Chang
7,594,826 B2 9/2009 Kobayashi et al.
7,604,490 B2 10/2009 Chen et al.
7,604,502 B2 10/2009 Pan
7,645,165 B2 1/2010 Wu et al.
7,674,133 B2 3/2010 Fogg et al.
7,690,946 B2 4/2010 Knaub et al.
7,699,644 B2 4/2010 Szczesny et al.
7,699,663 B1 4/2010 Little et al.
7,722,401 B2 5/2010 Kirk et al.
7,727,027 B2 6/2010 Chiang et al.
7,727,028 B1 6/2010 Zhang et al.
7,731,537 B2 6/2010 Amleshi et al.
7,753,731 B2 7/2010 Cohen et al.
7,758,357 B2 7/2010 Pan et al.
7,771,233 B2 8/2010 Gailus
7,789,676 B2 9/2010 Morgan et al.
7,794,240 B2 9/2010 Cohen et al.
7,794,278 B2 9/2010 Cohen et al.
7,806,729 B2 10/2010 Nguyen et al.
7,824,192 B2 11/2010 Lin et al.
7,828,595 B2 11/2010 Mathews
7,871,296 B2 1/2011 Fowler et al.
7,874,873 B2 1/2011 Do et al.
7,883,369 B1 2/2011 Sun et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,927,143 B2 4/2011 Helster et al.
7,946,889 B2 5/2011 Mizumura
7,985,097 B2 7/2011 Gulla
7,993,147 B2 8/2011 Cole et al.
8,018,733 B2 9/2011 Jia
8,057,267 B2 11/2011 Johnescu
8,083,553 B2 12/2011 Manter et al.
8,123,544 B2 2/2012 Kobayashi
8,182,289 B2 5/2012 Stokoe et al.
8,215,968 B2 7/2012 Cartier et al.
8,216,001 B2 7/2012 Kirk
8,251,745 B2 8/2012 Johnescu
8,262,411 B2 9/2012 Kondo
8,267,721 B2 9/2012 Minich
8,272,877 B2 9/2012 Stokoe et al.
8,337,247 B2 12/2012 Zhu
8,348,701 B1 1/2013 Lan et al.
8,371,875 B2 2/2013 Gailus
8,382,524 B2 2/2013 Khilchenko et al.
8,440,637 B2 5/2013 Elmen
8,480,432 B2 7/2013 Wu
8,506,319 B2 8/2013 Ritter et al.
8,506,331 B2 8/2013 Wu
8,545,253 B2 10/2013 Amidon et al.
8,550,861 B2 10/2013 Cohen et al.
8,597,051 B2 12/2013 Yang et al.
8,657,627 B2 2/2014 McNamara et al.
8,678,860 B2 3/2014 Minich et al.
8,715,003 B2 5/2014 Buck et al.
8,715,005 B2 5/2014 Pan
8,740,637 B2 6/2014 Wang et al.
8,764,492 B2 7/2014 Chiang
8,771,016 B2 7/2014 Atkinson et al.
8,864,506 B2 10/2014 Little
8,864,521 B2 10/2014 Atkinson et al.
8,905,777 B2 12/2014 Zhu et al.
8,926,377 B2 1/2015 Kirk et al.
8,944,831 B2 2/2015 Stoner et al.
8,968,034 B2 3/2015 Hsu
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,065,230 B2 6/2015 Milbrand, Jr.
9,077,115 B2 7/2015 Yang
9,083,130 B2 7/2015 Casher et al.
9,124,009 B2 9/2015 Atkinson et al.
9,219,335 B2 12/2015 Atkinson et al.
9,225,083 B2 12/2015 Krenceski et al.
9,225,085 B2 12/2015 Cartier, Jr. et al.
9,246,253 B1 1/2016 Defibaugh et al.
9,257,778 B2 2/2016 Buck et al.
9,257,794 B2 2/2016 Wanha et al.
9,263,835 B2 2/2016 Guo
9,281,590 B1 3/2016 Liu et al.
9,287,668 B2 3/2016 Chen et al.
9,300,074 B2 3/2016 Gailus
9,337,585 B1 5/2016 Yang
9,350,095 B2 5/2016 Arichika et al.
9,431,734 B2 8/2016 Guo et al.
9,450,344 B2 9/2016 Cartier, Jr. et al.
9,461,378 B1 10/2016 Chen
9,484,674 B2 11/2016 Cartier, Jr. et al.
9,490,587 B1 11/2016 Phillips et al.
9,509,101 B2 11/2016 Cartier, Jr. et al.
9,520,686 B2 12/2016 Hu et al.
9,520,689 B2 12/2016 Cartier, Jr. et al.
9,537,250 B2 1/2017 Kao et al.
9,640,915 B2 5/2017 Phillips
9,692,183 B2 6/2017 Phillips
9,692,188 B2 6/2017 Godana et al.
9,705,255 B2 7/2017 Atkinson et al.
9,742,132 B1 8/2017 Hsueh
9,748,698 B1 8/2017 Morgan et al.

(56) References Cited

U.S. PATENT DOCUMENTS

| | | | |
|---|---|---|---|
| 9,831,588 | B2 | 11/2017 | Cohen |
| 9,831,605 | B2 | 11/2017 | Buck et al. |
| 9,843,135 | B2 | 12/2017 | Guetig et al. |
| 9,899,774 | B2 | 2/2018 | Gailus |
| 9,923,309 | B1 | 3/2018 | Aizawa et al. |
| 9,935,385 | B2 | 4/2018 | Phillips et al. |
| 9,972,945 | B1 | 5/2018 | Huang et al. |
| 9,985,389 | B1 | 5/2018 | Morgan et al. |
| 9,997,853 | B2 | 6/2018 | Little et al. |
| 9,997,871 | B2 | 6/2018 | Zhong |
| 10,038,284 | B2 | 7/2018 | Krenceski et al. |
| 10,096,921 | B2 | 10/2018 | Johnescu et al. |
| 10,122,129 | B2 | 11/2018 | Milbrand, Jr. et al. |
| 10,135,197 | B2 | 11/2018 | Little et al. |
| 10,148,025 | B1 | 12/2018 | Trout et al. |
| 10,186,814 | B2 | 1/2019 | Khilchenko et al. |
| 10,211,577 | B2 | 2/2019 | Milbrand, Jr. et al. |
| 10,243,304 | B2 | 3/2019 | Kirk et al. |
| 10,270,191 | B1 | 4/2019 | Li et al. |
| 10,276,995 | B2 | 4/2019 | Little |
| 10,283,910 | B1 | 5/2019 | Chen et al. |
| 10,320,102 | B2 | 6/2019 | Phillips et al. |
| 10,320,125 | B2 | 6/2019 | Ju et al. |
| 10,348,040 | B2 | 7/2019 | Cartier, Jr. et al. |
| 10,355,416 | B1 | 7/2019 | Pickel et al. |
| 10,381,767 | B1 | 8/2019 | Milbrand, Jr. et al. |
| 10,431,936 | B2 | 10/2019 | Horning et al. |
| 10,439,311 | B2 | 10/2019 | Phillips et al. |
| 10,446,983 | B2 | 10/2019 | Krenceski et al. |
| 10,511,128 | B2 | 12/2019 | Kirk et al. |
| 10,541,482 | B2 | 1/2020 | Sasame et al. |
| 10,573,987 | B2 | 2/2020 | Osaki et al. |
| 10,601,181 | B2 | 3/2020 | Lu et al. |
| 10,680,387 | B2 | 6/2020 | Cheng et al. |
| 10,714,875 | B2 | 7/2020 | Wan et al. |
| 10,777,921 | B2 | 9/2020 | Lu et al. |
| 10,797,417 | B2 | 10/2020 | Scholeno et al. |
| 10,797,446 | B2 | 10/2020 | Liu et al. |
| 10,826,214 | B2 | 11/2020 | Phillips et al. |
| 10,833,437 | B2 | 11/2020 | Huang et al. |
| 10,840,622 | B2 | 11/2020 | Sasame et al. |
| 10,916,894 | B2 | 2/2021 | Kirk et al. |
| 10,931,050 | B2 | 2/2021 | Cohen |
| 10,965,063 | B2 | 3/2021 | Krenceski et al. |
| 10,965,064 | B2 | 3/2021 | Hsu et al. |
| 11,146,025 | B2 | 10/2021 | Lu et al. |
| 11,189,971 | B2 | 11/2021 | Lu |
| 11,264,755 | B2 | 3/2022 | Te |
| 11,381,015 | B2 | 7/2022 | Lu |
| 11,444,397 | B2 | 9/2022 | Sasame et al. |
| 11,469,553 | B2 | 10/2022 | Johnescu et al. |
| 11,469,554 | B2 | 10/2022 | Ellison et al. |
| 2001/0012730 | A1 | 8/2001 | Ramey et al. |
| 2001/0041477 | A1 | 11/2001 | Billman et al. |
| 2001/0042632 | A1 | 11/2001 | Manov et al. |
| 2001/0046810 | A1 | 11/2001 | Cohen et al. |
| 2002/0042223 | A1 | 4/2002 | Belopolsky et al. |
| 2002/0061671 | A1 | 5/2002 | Torii |
| 2002/0086582 | A1 | 7/2002 | Nitta et al. |
| 2002/0089464 | A1 | 7/2002 | Joshi |
| 2002/0098738 | A1 | 7/2002 | Astbury et al. |
| 2002/0102885 | A1 | 8/2002 | Kline |
| 2002/0111068 | A1 | 8/2002 | Cohen et al. |
| 2002/0111069 | A1 | 8/2002 | Astbury et al. |
| 2002/0115335 | A1 | 8/2002 | Saito |
| 2002/0123266 | A1 | 9/2002 | Ramey et al. |
| 2002/0132518 | A1 | 9/2002 | Kobayashi |
| 2002/0136506 | A1 | 9/2002 | Asada et al. |
| 2002/0146926 | A1 | 10/2002 | Fogg et al. |
| 2002/0168898 | A1 | 11/2002 | Billman et al. |
| 2002/0172469 | A1 | 11/2002 | Benner et al. |
| 2002/0181215 | A1 | 12/2002 | Guenthner |
| 2002/0192988 | A1 | 12/2002 | Droesbeke et al. |
| 2003/0003803 | A1 | 1/2003 | Billman et al. |
| 2003/0008561 | A1 | 1/2003 | Lappoehn |
| 2003/0008562 | A1 | 1/2003 | Yamasaki |
| 2003/0022555 | A1 | 1/2003 | Vicich et al. |
| 2003/0027439 | A1 | 2/2003 | Johnescu et al. |
| 2003/0109174 | A1 | 6/2003 | Korsunsky et al. |
| 2003/0119360 | A1 | 6/2003 | Jiang et al. |
| 2003/0143894 | A1 | 7/2003 | Kline et al. |
| 2003/0147227 | A1 | 8/2003 | Egitto et al. |
| 2003/0162441 | A1 | 8/2003 | Nelson et al. |
| 2003/0220018 | A1 | 11/2003 | Winings et al. |
| 2003/0220021 | A1 | 11/2003 | Whiteman et al. |
| 2004/0001299 | A1 | 1/2004 | van Haaster et al. |
| 2004/0005815 | A1 | 1/2004 | Mizumura et al. |
| 2004/0020674 | A1 | 2/2004 | McFadden et al. |
| 2004/0043661 | A1 | 3/2004 | Okada et al. |
| 2004/0058572 | A1 | 3/2004 | Fromm et al. |
| 2004/0072473 | A1 | 4/2004 | Wu |
| 2004/0097112 | A1 | 5/2004 | Minich et al. |
| 2004/0115968 | A1 | 6/2004 | Cohen |
| 2004/0121652 | A1 | 6/2004 | Gailus |
| 2004/0171305 | A1 | 9/2004 | McGowan et al. |
| 2004/0196112 | A1 | 10/2004 | Welbon et al. |
| 2004/0224559 | A1 | 11/2004 | Nelson et al. |
| 2004/0235352 | A1 | 11/2004 | Takemasa |
| 2004/0259419 | A1 | 12/2004 | Payne et al. |
| 2005/0006119 | A1 | 1/2005 | Cunningham et al. |
| 2005/0020135 | A1 | 1/2005 | Whiteman et al. |
| 2005/0039331 | A1 | 2/2005 | Smith |
| 2005/0048818 | A1 | 3/2005 | Pan |
| 2005/0048838 | A1 | 3/2005 | Korsunsky et al. |
| 2005/0048842 | A1 | 3/2005 | Benham et al. |
| 2005/0070160 | A1 | 3/2005 | Cohen et al. |
| 2005/0090299 | A1 | 4/2005 | Tsao et al. |
| 2005/0133245 | A1 | 6/2005 | Katsuyama et al. |
| 2005/0148239 | A1 | 7/2005 | Hull et al. |
| 2005/0176300 | A1 | 8/2005 | Hsu et al. |
| 2005/0176835 | A1 | 8/2005 | Kobayashi et al. |
| 2005/0215121 | A1 | 9/2005 | Tokunaga |
| 2005/0233610 | A1 | 10/2005 | Tutt et al. |
| 2005/0277315 | A1 | 12/2005 | Mongold et al. |
| 2005/0283974 | A1 | 12/2005 | Richard et al. |
| 2005/0287869 | A1 | 12/2005 | Kenny et al. |
| 2006/0009080 | A1 | 1/2006 | Regnier et al. |
| 2006/0019517 | A1 | 1/2006 | Raistrick et al. |
| 2006/0019525 | A1 | 1/2006 | Lloyd et al. |
| 2006/0019538 | A1 | 1/2006 | Davis et al. |
| 2006/0024983 | A1 | 2/2006 | Cohen et al. |
| 2006/0024984 | A1 | 2/2006 | Cohen et al. |
| 2006/0068640 | A1 | 3/2006 | Gailus |
| 2006/0073709 | A1 | 4/2006 | Reid |
| 2006/0104010 | A1 | 5/2006 | Donazzi et al. |
| 2006/0110977 | A1 | 5/2006 | Matthews |
| 2006/0141866 | A1 | 6/2006 | Shiu |
| 2006/0166551 | A1 | 7/2006 | Korsunsky et al. |
| 2006/0166560 | A1 | 7/2006 | Shuey et al. |
| 2006/0216969 | A1 | 9/2006 | Bright et al. |
| 2006/0255876 | A1 | 11/2006 | Kushta et al. |
| 2006/0276082 | A1 | 12/2006 | Hung et al. |
| 2006/0292932 | A1 | 12/2006 | Benham et al. |
| 2007/0004282 | A1 | 1/2007 | Cohen et al. |
| 2007/0004828 | A1 | 1/2007 | Khabbaz |
| 2007/0021000 | A1 | 1/2007 | Laurx |
| 2007/0021001 | A1 | 1/2007 | Laurx et al. |
| 2007/0021002 | A1 | 1/2007 | Laurx et al. |
| 2007/0021003 | A1 | 1/2007 | Laurx et al. |
| 2007/0021004 | A1 | 1/2007 | Laurx et al. |
| 2007/0037419 | A1 | 2/2007 | Sparrowhawk |
| 2007/0042639 | A1 | 2/2007 | Manter et al. |
| 2007/0054554 | A1 | 3/2007 | Do et al. |
| 2007/0059961 | A1 | 3/2007 | Cartier et al. |
| 2007/0111597 | A1 | 5/2007 | Kondou et al. |
| 2007/0141872 | A1 | 6/2007 | Szczesny et al. |
| 2007/0155241 | A1 | 7/2007 | Lappohn |
| 2007/0197063 | A1 | 8/2007 | Ngo et al. |
| 2007/0218765 | A1 | 9/2007 | Cohen et al. |
| 2007/0243764 | A1 | 10/2007 | Liu et al. |
| 2007/0275583 | A1 | 11/2007 | McNutt et al. |
| 2007/0293084 | A1 | 12/2007 | Ngo |
| 2008/0020640 | A1 | 1/2008 | Zhang et al. |
| 2008/0050968 | A1 | 2/2008 | Chang |

(56) References Cited

U.S. PATENT DOCUMENTS

| | | | |
|---|---|---|---|
| 2008/0194146 | A1 | 8/2008 | Gailus |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2008/0318455 | A1 | 12/2008 | Beaman et al. |
| 2009/0011641 | A1 | 1/2009 | Cohen et al. |
| 2009/0011643 | A1 | 1/2009 | Amleshi et al. |
| 2009/0011645 | A1 | 1/2009 | Laurx et al. |
| 2009/0029602 | A1 | 1/2009 | Cohen et al. |
| 2009/0035955 | A1 | 2/2009 | McNamara |
| 2009/0061661 | A1 | 3/2009 | Shuey et al. |
| 2009/0117386 | A1 | 5/2009 | Vacanti et al. |
| 2009/0124101 | A1 | 5/2009 | Minich et al. |
| 2009/0149045 | A1 | 6/2009 | Chen et al. |
| 2009/0203259 | A1 | 8/2009 | Nguyen et al. |
| 2009/0239395 | A1 | 9/2009 | Cohen et al. |
| 2009/0258516 | A1 | 10/2009 | Hiew et al. |
| 2009/0291593 | A1 | 11/2009 | Atkinson et al. |
| 2009/0305530 | A1 | 12/2009 | Ito et al. |
| 2009/0305533 | A1 | 12/2009 | Feldman et al. |
| 2009/0305553 | A1 | 12/2009 | Thomas et al. |
| 2010/0048058 | A1 | 2/2010 | Morgan et al. |
| 2010/0068934 | A1 | 3/2010 | Li et al. |
| 2010/0075538 | A1 | 3/2010 | Ohshida |
| 2010/0081302 | A1 | 4/2010 | Atkinson et al. |
| 2010/0099299 | A1 | 4/2010 | Moriyama et al. |
| 2010/0112846 | A1 | 5/2010 | Kotaka |
| 2010/0124851 | A1 | 5/2010 | Xiong et al. |
| 2010/0144167 | A1 | 6/2010 | Fedder et al. |
| 2010/0203772 | A1 | 8/2010 | Mao et al. |
| 2010/0273359 | A1 | 10/2010 | Walker et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0067237 | A1 | 3/2011 | Cohen et al. |
| 2011/0104948 | A1 | 5/2011 | Girard, Jr. et al. |
| 2011/0130038 | A1 | 6/2011 | Cohen et al. |
| 2011/0143605 | A1 | 6/2011 | Pepe |
| 2011/0212649 | A1 | 9/2011 | Stokoe et al. |
| 2011/0212650 | A1 | 9/2011 | Amleshi et al. |
| 2011/0230095 | A1 | 9/2011 | Atkinson et al. |
| 2011/0230096 | A1 | 9/2011 | Atkinson et al. |
| 2011/0256739 | A1 | 10/2011 | Toshiyuki et al. |
| 2011/0287663 | A1 | 11/2011 | Gailus et al. |
| 2012/0077380 | A1 | 3/2012 | Minich et al. |
| 2012/0094536 | A1 | 4/2012 | Khilchenko et al. |
| 2012/0115371 | A1 | 5/2012 | Chuang et al. |
| 2012/0156929 | A1 | 6/2012 | Manter et al. |
| 2012/0184145 | A1 | 7/2012 | Zeng |
| 2012/0184154 | A1 | 7/2012 | Frank et al. |
| 2012/0202363 | A1 | 8/2012 | McNamara et al. |
| 2012/0202386 | A1 | 8/2012 | McNamara et al. |
| 2012/0202387 | A1 | 8/2012 | McNamara |
| 2012/0214343 | A1 | 8/2012 | Buck et al. |
| 2012/0214344 | A1 | 8/2012 | Cohen et al. |
| 2013/0012038 | A1 | 1/2013 | Kirk et al. |
| 2013/0017733 | A1 | 1/2013 | Kirk et al. |
| 2013/0065454 | A1 | 3/2013 | Milbrand Jr. |
| 2013/0078870 | A1 | 3/2013 | Milbrand, Jr. |
| 2013/0078871 | A1 | 3/2013 | Milbrand, Jr. |
| 2013/0090001 | A1 | 4/2013 | Kagotani |
| 2013/0109232 | A1 | 5/2013 | Paniaqua |
| 2013/0143442 | A1 | 6/2013 | Cohen et al. |
| 2013/0196553 | A1 | 8/2013 | Gailus |
| 2013/0217263 | A1 | 8/2013 | Pan |
| 2013/0225006 | A1 | 8/2013 | Khilchenko et al. |
| 2013/0237100 | A1 | 9/2013 | Affeltranger |
| 2013/0273781 | A1 | 10/2013 | Buck et al. |
| 2013/0288513 | A1 | 10/2013 | Masubuchi et al. |
| 2013/0316590 | A1 | 11/2013 | Hon |
| 2013/0340251 | A1 | 12/2013 | Regnier et al. |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0024263 | A1 | 1/2014 | Dong et al. |
| 2014/0057498 | A1 | 2/2014 | Cohen |
| 2014/0113487 | A1 | 4/2014 | Chen et al. |
| 2014/0273557 | A1 | 9/2014 | Cartier, Jr. et al. |
| 2014/0273627 | A1 | 9/2014 | Cartier, Jr. et al. |
| 2014/0370729 | A1 | 12/2014 | Wang |
| 2014/0377992 | A1 | 12/2014 | Chang et al. |
| 2015/0056856 | A1 | 2/2015 | Atkinson et al. |
| 2015/0072546 | A1 | 3/2015 | Li |
| 2015/0099408 | A1 | 4/2015 | Myer et al. |
| 2015/0111401 | A1 | 4/2015 | Guo |
| 2015/0111427 | A1 | 4/2015 | Wu et al. |
| 2015/0126068 | A1 | 5/2015 | Fang |
| 2015/0140866 | A1 | 5/2015 | Tsai et al. |
| 2015/0214673 | A1 | 7/2015 | Gao et al. |
| 2015/0236451 | A1 | 8/2015 | Cartier, Jr. et al. |
| 2015/0236452 | A1 | 8/2015 | Cartier, Jr. et al. |
| 2015/0255904 | A1 | 9/2015 | Ito |
| 2015/0255926 | A1 | 9/2015 | Paniagua |
| 2015/0340798 | A1 | 11/2015 | Kao et al. |
| 2015/0380868 | A1 | 12/2015 | Chen et al. |
| 2016/0000616 | A1 | 1/2016 | Lavoie |
| 2016/0134057 | A1 | 5/2016 | Buck et al. |
| 2016/0149343 | A1 | 5/2016 | Atkinson et al. |
| 2016/0156133 | A1 | 6/2016 | Masubuchi et al. |
| 2016/0172794 | A1 | 6/2016 | Sparrowhawk et al. |
| 2016/0211618 | A1 | 7/2016 | Gailus |
| 2016/0268744 | A1 | 9/2016 | Little et al. |
| 2017/0077654 | A1 | 3/2017 | Yao et al. |
| 2017/0352970 | A1 | 12/2017 | Liang et al. |
| 2018/0062323 | A1 | 3/2018 | Kirk et al. |
| 2018/0076555 | A1 | 3/2018 | Scholeno et al. |
| 2018/0109043 | A1 | 4/2018 | Provencher et al. |
| 2018/0145438 | A1 | 5/2018 | Cohen |
| 2018/0166828 | A1 | 6/2018 | Gailus |
| 2018/0198220 | A1 | 7/2018 | Sasame et al. |
| 2018/0205177 | A1 | 7/2018 | Zhou et al. |
| 2018/0212376 | A1 | 7/2018 | Wang et al. |
| 2018/0212385 | A1 | 7/2018 | Little |
| 2018/0219331 | A1 | 8/2018 | Cartier, Jr. et al. |
| 2018/0241156 | A1 | 8/2018 | Huang et al. |
| 2018/0269607 | A1 | 9/2018 | Wu et al. |
| 2018/0331444 | A1 | 11/2018 | Ono |
| 2019/0006778 | A1 | 1/2019 | Fan et al. |
| 2019/0036256 | A1 | 1/2019 | Martens et al. |
| 2019/0044284 | A1 | 2/2019 | Dunham |
| 2019/0052019 | A1 | 2/2019 | Huang et al. |
| 2019/0067854 | A1 | 2/2019 | Ju et al. |
| 2019/0173209 | A1 | 6/2019 | Lu et al. |
| 2019/0173232 | A1 | 6/2019 | Lu et al. |
| 2019/0214755 | A1 | 7/2019 | Manickam |
| 2019/0334292 | A1 | 10/2019 | Cartier, Jr. et al. |
| 2019/0393634 | A1* | 12/2019 | Kao .................. H01R 13/6471 |
| 2020/0021052 | A1 | 1/2020 | Milbrand, Jr. et al. |
| 2020/0076132 | A1 | 3/2020 | Yang et al. |
| 2020/0076135 | A1 | 3/2020 | Tang et al. |
| 2020/0153134 | A1 | 5/2020 | Sasame et al. |
| 2020/0161811 | A1 | 5/2020 | Lu |
| 2020/0194940 | A1 | 6/2020 | Cohen et al. |
| 2020/0203865 | A1 | 6/2020 | Wu et al. |
| 2020/0203867 | A1 | 6/2020 | Lu |
| 2020/0203886 | A1 | 6/2020 | Wu et al. |
| 2020/0220289 | A1 | 7/2020 | Scholeno et al. |
| 2020/0235529 | A1 | 7/2020 | Kirk et al. |
| 2020/0251841 | A1 | 8/2020 | Stokoe et al. |
| 2020/0259294 | A1 | 8/2020 | Lu |
| 2020/0266584 | A1 | 8/2020 | Lu |
| 2020/0266585 | A1 | 8/2020 | Paniagua et al. |
| 2020/0335914 | A1 | 10/2020 | Hsu et al. |
| 2020/0358226 | A1 | 11/2020 | Lu et al. |
| 2020/0395698 | A1 | 12/2020 | Hou et al. |
| 2020/0403350 | A1 | 12/2020 | Hsu |
| 2021/0036452 | A1 | 2/2021 | Phillips et al. |
| 2021/0050683 | A1 | 2/2021 | Sasame et al. |
| 2021/0126403 | A1* | 4/2021 | Zhang .................. H01R 12/716 |
| 2021/0135389 | A1 | 5/2021 | Jiang |
| 2021/0135403 | A1 | 5/2021 | Yang et al. |
| 2021/0135404 | A1 | 5/2021 | Jiang |
| 2021/0159643 | A1 | 5/2021 | Kirk et al. |

(56) References Cited

U.S. PATENT DOCUMENTS

| | | | |
|---|---|---|---|
| 2021/0175670 A1 | 6/2021 | Cartier, Jr. et al. |
| 2021/0203096 A1 | 7/2021 | Cohen |
| 2021/0203104 A1 | 7/2021 | Chen |
| 2021/0218195 A1 | 7/2021 | Hsu et al. |
| 2021/0234314 A1 | 7/2021 | Johnescu et al. |
| 2021/0234315 A1 | 7/2021 | Ellison et al. |
| 2021/0242632 A1 | 8/2021 | Trout et al. |
| 2021/0399449 A1 | 12/2021 | Guo et al. |
| 2022/0059954 A1 | 2/2022 | Yue |
| 2022/0069496 A1 | 3/2022 | Yi et al. |
| 2022/0077632 A1 | 3/2022 | Chen et al. |
| 2022/0094099 A1 | 3/2022 | Liu et al. |
| 2022/0102916 A1 | 3/2022 | Liu et al. |
| 2022/0336980 A1 | 10/2022 | Lu |

FOREIGN PATENT DOCUMENTS

| | | | |
|---|---|---|---|
| CN | 1175101 | A | 3/1998 |
| CN | 1192068 | A | 9/1998 |
| CN | 1237652 | A | 12/1999 |
| CN | 1265470 | A | 9/2000 |
| CN | 2400938 | Y | 10/2000 |
| CN | 1275825 | A | 12/2000 |
| CN | 1276597 | A | 12/2000 |
| CN | 1280405 | A | 1/2001 |
| CN | 1299524 | A | 6/2001 |
| CN | 2513247 | Y | 9/2002 |
| CN | 2519434 | Y | 10/2002 |
| CN | 2519458 | Y | 10/2002 |
| CN | 2519592 | Y | 10/2002 |
| CN | 1394829 | A | 2/2003 |
| CN | 1398446 | A | 2/2003 |
| CN | 1401147 | A | 3/2003 |
| CN | 1471749 | A | 1/2004 |
| CN | 1489810 | A | 4/2004 |
| CN | 1491465 | A | 4/2004 |
| CN | 1502151 | A | 6/2004 |
| CN | 1516723 | A | 7/2004 |
| CN | 1179448 | C | 12/2004 |
| CN | 1561565 | A | 1/2005 |
| CN | 1203341 | C | 5/2005 |
| CN | 1639866 | A | 7/2005 |
| CN | 1650479 | A | 8/2005 |
| CN | 1764020 | A | 4/2006 |
| CN | 1799290 | A | 7/2006 |
| CN | 2798361 | Y | 7/2006 |
| CN | 2865050 | Y | 1/2007 |
| CN | 2896615 | Y | 5/2007 |
| CN | 1985199 | A | 6/2007 |
| CN | 1996678 | A | 7/2007 |
| CN | 2930006 | Y | 8/2007 |
| CN | 101019277 | A | 8/2007 |
| CN | 101032060 | A | 9/2007 |
| CN | 201000949 | | 1/2008 |
| CN | 101124697 | A | 2/2008 |
| CN | 101176389 | A | 5/2008 |
| CN | 101208837 | A | 6/2008 |
| CN | 101273501 | A | 9/2008 |
| CN | 201112782 | | 9/2008 |
| CN | 101312275 | A | 11/2008 |
| CN | 101316012 | A | 12/2008 |
| CN | 201222548 | | 4/2009 |
| CN | 201252183 | | 6/2009 |
| CN | 101552410 | A | 10/2009 |
| CN | 201323275 | | 10/2009 |
| CN | 101600293 | A | 12/2009 |
| CN | 201374433 | | 12/2009 |
| CN | 201374434 | Y | 12/2009 |
| CN | 101752700 | A | 6/2010 |
| CN | 101790818 | A | 7/2010 |
| CN | 101120490 | B | 11/2010 |
| CN | 101926055 | A | 12/2010 |
| CN | 101964463 | A | 2/2011 |
| CN | 101124697 | B | 3/2011 |
| CN | 201846527 | U | 5/2011 |
| CN | 102106041 | A | 6/2011 |
| CN | 201868621 | U | 6/2011 |
| CN | 102195173 | A | 9/2011 |
| CN | 102224640 | A | 10/2011 |
| CN | 102232259 | A | 11/2011 |
| CN | 102239605 | A | 11/2011 |
| CN | 102282731 | A | 12/2011 |
| CN | 102292881 | A | 12/2011 |
| CN | 101600293 | B | 5/2012 |
| CN | 102456990 | A | 5/2012 |
| CN | 102487166 | A | 6/2012 |
| CN | 102570100 | A | 7/2012 |
| CN | 102593661 | A | 7/2012 |
| CN | 102598430 | A | 7/2012 |
| CN | 202395248 | U | 8/2012 |
| CN | 101258649 | B | 9/2012 |
| CN | 102694318 | A | 9/2012 |
| CN | 102738621 | A | 10/2012 |
| CN | 102176586 | B | 11/2012 |
| CN | 102859805 | A | 1/2013 |
| CN | 202695788 | U | 1/2013 |
| CN | 202695861 | U | 1/2013 |
| CN | 102986091 | A | 3/2013 |
| CN | 103036081 | A | 4/2013 |
| CN | 103594871 | A | 2/2014 |
| CN | 203445304 | U | 2/2014 |
| CN | 103840285 | A | 6/2014 |
| CN | 203690614 | U | 7/2014 |
| CN | 204030057 | U | 12/2014 |
| CN | 204167554 | U | 2/2015 |
| CN | 104409906 | A | 3/2015 |
| CN | 204190038 | U | 3/2015 |
| CN | 104577577 | A | 4/2015 |
| CN | 104659573 | A | 5/2015 |
| CN | 204349140 | U | 5/2015 |
| CN | 204577746 | U | 8/2015 |
| CN | 204696287 | U | 10/2015 |
| CN | 205212085 | U | 5/2016 |
| CN | 105633660 | A | 6/2016 |
| CN | 105703103 | A | 6/2016 |
| CN | 102820589 | B | 8/2016 |
| CN | 106099546 | A | 11/2016 |
| CN | 107069274 | A | 8/2017 |
| CN | 107069281 | A | 8/2017 |
| CN | 304240766 | S | 8/2017 |
| CN | 304245430 | S | 8/2017 |
| CN | 206712072 | U | 12/2017 |
| CN | 206712089 | U | 12/2017 |
| CN | 107706632 | A | 2/2018 |
| CN | 207677189 | U | 7/2018 |
| CN | 208078300 | U | 11/2018 |
| CN | 208209042 | U | 12/2018 |
| CN | 208797273 | U | 4/2019 |
| CN | 109994892 | A | 7/2019 |
| CN | 210111108 | U | 2/2020 |
| CN | 210326355 | U | 4/2020 |
| CN | 111430991 | A | 7/2020 |
| CN | 111512499 | A | 8/2020 |
| CN | 111555069 | A | 8/2020 |
| CN | 112072400 | A | 12/2020 |
| CN | 212412336 | U | 1/2021 |
| CN | 107706675 | B | 4/2021 |
| CN | 212874843 | U | 4/2021 |
| CN | 213636403 | U | 7/2021 |
| CN | 113517619 | A | 10/2021 |
| DE | 4109863 | A1 | 10/1992 |
| DE | 4238777 | A1 | 5/1993 |
| DE | 19853837 | C1 | 2/2000 |
| DE | 102006044479 | A1 | 5/2007 |
| DE | 60216728 | T2 | 11/2007 |
| EP | 0560551 | A1 | 9/1993 |
| EP | 0774807 | A2 | 5/1997 |
| EP | 0820124 | A2 | 1/1998 |
| EP | 0903816 | A2 | 3/1999 |
| EP | 1018784 | A1 | 7/2000 |
| EP | 1779472 | A1 | 5/2007 |
| EP | 1794845 | A1 | 6/2007 |
| EP | 2169770 | A2 | 3/2010 |
| EP | 2262061 | A1 | 12/2010 |

(56) References Cited

FOREIGN PATENT DOCUMENTS

| | | | |
|---|---|---|---|
| EP | 2388867 | A2 | 11/2011 |
| EP | 2405537 | A1 | 1/2012 |
| EP | 1794845 | B1 | 3/2013 |
| GB | 1049435 | A | 11/1966 |
| GB | 1272347 | A | 4/1972 |
| GB | 2161658 | A | 1/1986 |
| GB | 2283620 | A | 5/1995 |
| HK | 1043254 | A1 | 9/2002 |
| JP | H3-156761 | A2 | 7/1991 |
| JP | H05-54201 | A | 3/1993 |
| JP | H05-234642 | A | 9/1993 |
| JP | H07-57813 | A | 3/1995 |
| JP | H07-302649 | A | 11/1995 |
| JP | H09-63703 | A | 3/1997 |
| JP | H09-274969 | A | 10/1997 |
| JP | 2711601 | B2 | 2/1998 |
| JP | H11-67367 | A | 3/1999 |
| JP | 2896836 | B2 | 5/1999 |
| JP | H11-233200 | A | 8/1999 |
| JP | H11-260497 | A | 9/1999 |
| JP | 2000-013081 | A | 1/2000 |
| JP | 2000-311749 | A | 11/2000 |
| JP | 2001-068888 | A | 3/2001 |
| JP | 2001-510627 | A | 7/2001 |
| JP | 2001-217052 | A | 8/2001 |
| JP | 2002-042977 | A | 2/2002 |
| JP | 2002-053757 | A | 2/2002 |
| JP | 2002-075052 | A | 3/2002 |
| JP | 2002-075544 | A | 3/2002 |
| JP | 2002-117938 | A | 4/2002 |
| JP | 2002-151190 | A2 | 5/2002 |
| JP | 2002-246107 | A | 8/2002 |
| JP | 2003-017193 | A | 1/2003 |
| JP | 2003-309395 | A | 10/2003 |
| JP | 2004-192939 | A | 7/2004 |
| JP | 2004-259621 | A | 9/2004 |
| JP | 3679470 | B2 | 8/2005 |
| JP | 2006-344524 | A | 12/2006 |
| JP | 2008-515167 | A | 5/2008 |
| JP | 2009-043717 | A | 2/2009 |
| JP | 2009-110956 | A | 5/2009 |
| JP | 2010-129173 | A | 6/2010 |
| MX | 9907324 | A1 | 8/2000 |
| TW | 466650 | B | 12/2001 |
| TW | 517002 | B | 1/2003 |
| TW | 534494 | U | 5/2003 |
| TW | 200501874 | A | 1/2005 |
| TW | 200515773 | A | 5/2005 |
| TW | M274675 | U | 9/2005 |
| TW | M329891 | U | 4/2008 |
| TW | 200835073 | A | 8/2008 |
| TW | M357771 | U | 5/2009 |
| TW | 200926536 | A | 6/2009 |
| TW | M403141 | U | 5/2011 |
| TW | M474278 | U | 3/2014 |
| TW | M494411 | U | 1/2015 |
| TW | I475770 | B | 3/2015 |
| TW | M502979 | U | 6/2015 |
| TW | M518837 | U | 3/2016 |
| TW | I535129 | B | 5/2016 |
| TW | M534922 | U | 1/2017 |
| TW | I596840 | B | 8/2017 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M605564 | U | 12/2020 |
| TW | M613035 | U | 6/2021 |
| WO | WO 85/02265 | A1 | 5/1985 |
| WO | WO 88/05218 | A1 | 7/1988 |
| WO | WO 98/35409 | A1 | 8/1998 |
| WO | WO 01/39332 | A1 | 5/2001 |
| WO | WO 01/57963 | A2 | 8/2001 |
| WO | WO 2002/061892 | A1 | 8/2002 |
| WO | WO 03/013199 | A2 | 2/2003 |
| WO | WO 03/047049 | A1 | 6/2003 |
| WO | WO 2004/034539 | A1 | 4/2004 |
| WO | WO 2004/051809 | A2 | 6/2004 |
| WO | WO 2004/059794 | A2 | 7/2004 |
| WO | WO 2004/059801 | A1 | 7/2004 |
| WO | WO 2004/114465 | A2 | 12/2004 |
| WO | WO 2005/011062 | A2 | 2/2005 |
| WO | WO 2005/114274 | A1 | 12/2005 |
| WO | WO 2006/039277 | A1 | 4/2006 |
| WO | WO 2007/005597 | A2 | 1/2007 |
| WO | WO 2007/005598 | A2 | 1/2007 |
| WO | WO 2007/005599 | A1 | 1/2007 |
| WO | WO 2008/124052 | A2 | 10/2008 |
| WO | WO 2008/124054 | A2 | 10/2008 |
| WO | WO 2008/124101 | A2 | 10/2008 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/060236 | A1 | 5/2011 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |
| WO | WO 2011/140438 | A3 | 12/2011 |
| WO | WO 2012/106554 | A2 | 8/2012 |
| WO | WO 2013/059317 | A1 | 4/2013 |
| WO | WO 2015/112717 | A1 | 7/2015 |
| WO | WO 2016/008473 | A1 | 1/2016 |
| WO | WO 2017/007429 | A1 | 1/2017 |
| WO | WO 2018/039164 | A1 | 3/2018 |
| WO | WO 2019/084717 | A1 | 5/2019 |

OTHER PUBLICATIONS

CN 200680023997.6, Jun. 1, 2021, Chinese Invalidation Request.
CN 201110008089.2, Sep. 9, 2021, Chinese Invalidation Request.
CN 201180033750.3, Jun. 15, 2021, Chinese Invalidation Request.
CN 201210249710.9, Jun. 17, 2021, Chinese Supplemental Observations.
CN 201580014851.4, Jun. 1, 2020, Chinese communication.
CN 201580014851.4, Sep. 4, 2019, Chinese Office Action.
CN 201610952606.4, Mar. 17, 2021, Chinese Invalidation Request.
CN 201680051491.X, Apr. 30, 2019, Chinese Office Action.
CN 201780064531.9, Jan. 2, 2020, Chinese Office Action.
CN 201780097919.9, Dec. 3, 2021, Chinese Office Action.
CN 201780097919.9, Mar. 10, 2021, Chinese Office Action.
CN 202010031395.7, Jan. 18, 2021, Chinese Office Action.
CN 202010467444.1, Apr. 2, 2021, Chinese Office Action.
CN 202010825662.8, Sep. 3, 2021, Chinese Office Action.
CN 202010922401.8, Aug. 6, 2021, Chinese Office Action.
EP 11166820.8, Jan. 24, 2012, Extended European Search Report.
EP 17930428.2, Sep. 8, 2022, European Communication.
EP 17930428.2, May 19, 2021, Extended European Search Report.
PCT/CN2017/108344, Mar. 6, 2020, International Preliminary Report on Patentability Chapter II.
PCT/CN2017/108344, Aug. 1, 2018, International Search Report and Written Opinion.
PCT/CN2018/118798, Jul. 18, 2019, International Search Report and Written Opinion.
PCT/CN2021/114671, Nov. 29, 2021, International Search Report and Written Opinion.
PCT/CN2021/119849, Dec. 28, 2021, International Search Report and Written Opinion.
PCT/SG2016/050317, Jan. 18, 2018, International Preliminary Report on Patentability.
PCT/SG2016/050317, Oct. 18, 2016, International Search Report and Written Opinion.

(56) References Cited

OTHER PUBLICATIONS

PCT/US2005/034605, Apr. 3, 2007, International Preliminary Report on Patentability.
PCT/US2005/034605, Jan. 26, 2006, International Search Report and Written Opinion.
PCT/US2006/025562, Jan. 9, 2008, International Preliminary Report on Patentability.
PCT/US2006/025562, Oct. 31, 2007, International Search Report and Written Opinion.
PCT/US2010/056482, May 24, 2012, International Preliminary Report on Patentability.
PCT/US2010/056482, Mar. 14, 2011, International Search Report and Written Opinion.
PCT/US2011/026139, Sep. 7, 2012, International Preliminary Report on Patentability.
PCT/US2011/026139, Nov. 22, 2011, International Search Report and Written Opinion.
PCT/US2011/034747, Jul. 28, 2011, International Search Report and Written Opinion.
PCT/US2012/023689, Aug. 15, 2013, International Preliminary Report on Patentability.
PCT/US2012/023689, Sep. 12, 2012, International Search Report and Written Opinion.
PCT/US2012/060610, May 1, 2014, International Preliminary Report on Patentability.
PCT/US2012/060610, Mar. 29, 2013, International Search Report and Written Opinion.
PCT/US2015/012463, Aug. 4, 2016, International Preliminary Report on Patentability.
PCT/US2015/012463, May 13, 2015, International Search Report and Written Opinion.
PCT/US2017/047905, Mar. 7, 2019, International Preliminary Report on Patentability.
PCT/US2017/047905, Dec. 4, 2017, International Search Report and Written Opinion.
PCT/US2021/015048, Apr. 5, 2022, International Preliminary Report on Patentability Chapter II.
PCT/US2021/015048, Jul. 1, 2021, International Search Report and Written Opinion.
PCT/US2021/015073, Apr. 1, 2022, International Preliminary Report on Patentability Chapter II.
PCT/US2021/015073, May 17, 2021, International Search Report and Written Opinion.
TW 106128439, Mar. 5, 2021, Taiwanese Office Action.
TW 107138468, Jun. 16, 2022, Taiwanese Office Action.
TW 110140608, Mar. 15, 2022, Taiwanese Office Action.
Chinese Invalidation Request dated Aug. 17, 2021 in connection with Chinese Application No. 200580040906.5.
Chinese Invalidation Request dated Jun. 1, 2021 in connection with Chinese Application No. 200680023997.6.
Chinese Invalidation Request dated Sep. 9, 2021 in connection with Chinese Application No. 201110008089.2.
Chinese Invalidation Request dated Jun. 15, 2021 in connection with Chinese Application No. 201180033750.3.
Chinese Supplemental Observations dated Jun. 17, 2021 in connection with Chinese Application No. 201210249710.9.
Chinese communication for Chinese Application No. 201580014851.4, dated Jun. 1, 2020.
Chinese Office Action for Chinese Application No. 201580014851.4 dated Sep. 4, 2019.
Chinese Invalidation Request dated Mar. 17, 2021 in connection with Chinese Application No. 201610952606.4.
Chinese Office Action for Application No. 201680051491.X dated Apr. 30, 2019.
Chinese Office Action for Chinese Application No. 201780064531.9 dated Jan. 2, 2020.
Chinese Office Action for Chinese Application No. 201780097919.9, dated Dec. 3, 2021.
Chinese Office Action for Chinese Application No. 201780097919.9, dated Mar. 10, 2021.
Chinese Office Action dated Jan. 18, 2021 in connection with Chinese Application No. 202010031395.7.
Chinese Office Action for Chinese Application No. 202010467444.1 dated Apr. 2, 2021.
Chinese Office Action for Chinese Application No. 202010825662.8 dated Sep. 3, 2021.
Chinese Office Action for Chinese Application No. 202010922401.8 dated Aug. 6, 2021.
Extended European Search Report for European Application No. EP 11166820.8 dated Jan. 24, 2012.
European Communication Pursuant to Article 94(3) EPC dated Sep. 8, 2022 for European Application No. 17930428.2.
Extended European Search Report dated May 19, 2021 in connection with European Application No. 17930428.2.
International Preliminary Report on Patentability Chapter II for International Application No. PCT/CN2017/108344 mailed Mar. 6, 2020.
International Search Report and Written Opinion for International Application No. PCT/CN2017/108344 dated Aug. 1, 2018.
International Search Report and Written Opinion mailed Jul. 18, 2019 for International Application No. PCT/CN2018/118798.
International Search Report and Written Opinion mailed Nov. 29, 2021 for International Application No. PCT/CN2021/114671.
International Search Report and Written Opinion mailed Dec. 28, 2021 in connection with International Application No. PCT/CN2021/119849.
International Preliminary Report on Patentability for International Application No. PCT/SG2016/050317 dated Jan. 18, 2018.
International Search Report and Written Opinion for International Application No. PCT/SG2016/050317 dated Oct. 18, 2016.
International Preliminary Report on Patentability for International Application No. PCT/US2005/034605 dated Apr. 3, 2007.
International Search Report and Written Opinion for International Application No. PCT/US2005/034605 mailed Jan. 26, 2006.
International Preliminary Report on Patentability for International Application No. PCT/US2006/025562 dated Jan. 9, 2008.
International Search Report with Written Opinion for International Application No. PCT/US2006/025562 mailed Oct. 31, 2007.
International Preliminary Report on Patentability for International Application No. PCT/US2010/056482 mailed May 24, 2012.
International Search Report and Written Opinion for International Application No. PCT/US2010/056482 mailed Mar. 14, 2011.
International Preliminary Report on Patentability for International Application No. PCT/US2011/026139 mailed Sep. 7, 2012.
International Search Report and Written Opinion for International Application No. PCT/US2011/026139 mailed Nov. 22, 2011.
International Search Report and Written Opinion for International Application No. PCT/US2011/034747 mailed Jul. 28, 2011.
International Preliminary Report on Patentability for International Application No. PCT/US2012/023689 mailed Aug. 15, 2013.
International Search Report and Written Opinion for International Application No. PCT/US2012/023689 mailed Sep. 12, 2012.
International Preliminary Report on Patentability for International Application No. PCT/US2012/060610 mailed May 1, 2014.
International Search Report and Written Opinion for International Application No. PCT/US2012/060610 mailed Mar. 29, 2013.
International Preliminary Report on Patentability for International Application No. PCT/US2015/012463 mailed Aug. 4, 2016.
International Search Report and Written Opinion for International Application No. PCT/US2015/012463 mailed May 13, 2015.
International Preliminary Report on Patentability for International Application No. PCT/US2017/047905, mailed Mar. 7, 2019.
International Search Report and Written Opinion for International Application No. PCT/US2017/047905 dated Dec. 4, 2017.
International Preliminary Report on Patentability Chapter II mailed Apr. 5, 2022 in connection with International Application No. PCT/US2021/015048.
International Search Report and Written Opinion mailed Jul. 1, 2021 in connection with International Application No. PCT/US2021/015048.
International Preliminary Report on Patentability Chapter II mailed Apr. 1, 2022 in connection with International Application No. PCT/US2021/015073.

(56) References Cited

OTHER PUBLICATIONS

International Search Report and Written Opinion mailed May 17, 2021 in connection with International Application No. PCT/US2021/015073.
Taiwanese Office Action dated Mar. 5, 2021 in connection with Taiwanese Application No. 106128439.
Taiwanese Office Action dated Jun. 16, 2022 for Taiwan Application No. 107138468.
Taiwanese Office Action dated Mar. 15, 2022 in connection with Taiwanese Application No. 110140608.
Decision Invalidating CN Patent Application No. 201610952606.4, which issued as CN Utility Model Patent No. 107069274B, and Certified Translation.
In re Certain Electrical Connectors and Cages, Components Thereof, and Prods. Containing the Same, Inv. No. 337-TA-1241, Order No. 31 (Oct. 19, 2021): Construing Certain Terms of the Asserted Claims of the Patents at Issue.
In re Matter of Certain Electrical Connectors and Cages, Components Thereof, and Products Containing the Same, Inv. No. 337-TA-1241, Complainant Amphenol Corporation's Corrected Initial Post-Hearing Brief. Public Version. Jan. 5, 2022. 451 pages.
In re Matter of Certain Electrical Connectors and Cages, Components Thereof, and Products Containing the Same, Inv. No. 337-TA-1241, Complainant Amphenol Corporation's Post-Hearing Reply Brief. Public Version. Dec. 6, 2021. 159 pages.
In re Matter of Certain Electrical Connectors and Cages, Components Thereof, and Products Containing the Same, Inv. No. 337-TA-1241, Luxshare Respondents' Initial Post-Hearing Brief. Public Version. Nov. 23, 2021. 348 pages.
In re Matter of Certain Electrical Connectors and Cages, Components Thereof, and Products Containing the Same, Inv. No. 337-TA-1241, Luxshare Respondents' Reply Post-Hearing Brief. Public Version. Dec. 6, 2021. 165 pages.
In re Matter of Certain Electrical Connectors and Cages, Components Thereof, and Products Containing the Same, Inv. No. 337-TA-1241, Notice of Prior Art. Jun. 3, 2021. 319 pages.
In re Matter of Certain Electrical Connectors and Cages, Components Thereof, and Products Containing the Same, Inv. No. 337-TA-1241, Respondents' Pre-Hearing Brief. Redacted. Oct. 21, 2021. 219 pages.
In the Matter of Certain Electrical Connectors and Cages, Components Thereof, and Products Containing the Same, Inv. No. 337-TA-1241, Final Initial Determination on Violation of Section 337. Public Version. Mar. 11, 2022. 393 pages.
Invalidity Claim Charts Based on CN 201112782Y ("Cai"). Luxshare Respondents' Supplemental Responses to Interrogatories Nos. 13 and 14, Exhibit 25. May 7, 2021. 147 pages.
Invalidity Claim Charts Based on U.S. Pat. No. 6,179,651 ("Huang"). Luxshare Respondents' Supplemental Responses to Interrogatories Nos. 13 and 14, Exhibit 26. May 7, 2021. 153 pages.
Invalidity Claim Charts Based on U.S. Pat. No. 7,261,591 ("Korsunsky"). Luxshare Respondents' Supplemental Responses to Interrogatories Nos. 13 and 14, Exhibit 27. May 7, 2021. 150 pages.
Petition for Inter Partes Review. *Luxshare Precision Industry Co., Ltd* v. *Amphenol Corp*. U.S. Pat. No. 10,381,767. IPR2022-00132. Nov. 4, 2021. 112 pages.
[No Author Listed], All About ESD Plastics. Evaluation Engineering. Jul. 1, 1998. 8 pages. https://www.evaluationengineering.com/home/article/13001136/all-about-esdplastics [last accessed Mar. 14, 2021].
[No Author Listed], AMP Incorporated Schematic, Cable Assay, 2 Pair, HMZD. Oct. 3, 2002. 1 page.
[No Author Listed], Board to Backplane Electrical Connector. The Engineer. Mar. 13, 2001, [last accessed Apr. 30, 2021]. 2 pages.
[No Author Listed], Borosil Vision Mezzo Mug Set of 2. Zola. 3 pages. https://www.zola.com/shop/product/borosil_vision_mezzao_mug_setof2_3.25. [date retrieved May 4, 2021].
[No Author Listed], Cable Systems. Samtec. Aug. 2010. 148 pages.
[No Author Listed], Carbon Nanotubes For Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.
[No Author Listed], Coating Electrical Contacts. Brush Wellman Engineered Materials. Jan. 2002;4(1). 2 pages.
[No Author Listed], Common Management Interface Specification. Rev 4.0. MSA Group. May 8, 2019. 265 pages.
[No Author Listed], Electronics Connector Overview. FCI. Sep. 23, 2009. 78 pages.
[No Author Listed], EMI Shielding Compounds Instead of Metal. RTP Company. Last Accessed Apr. 30, 2021. 2 pages.
[No Author Listed], EMI Shielding Solutions and EMC Testing Services from Laird Technologies. Laird Technologies. Last acessed Apr. 30, 2021. 1 page.
[No Author Listed], EMI Shielding, Dramatic Cost Reductions for Electronic Device Protection. RTP. Jan. 2000. 10 pages.
[No Author Listed], Excerpt from The Concise Oxford Dictionary, Tenth Edition. 1999. 3 pages.
[No Author Listed], Excerpt from The Merriam-Webster Dictionary, Between. 2005. 4 pages.
[No Author Listed], Excerpt from Webster's Third New International Dictionary, Contact. 1986. 3 pages.
[No Author Listed], FCI—High Speed Interconnect Solutions, Backpanel Connectors. FCI. [last accessed Apr. 30, 2021). 2 pages.
[No Author Listed], General Product Specification for GbX Backplane and Daughtercard Interconnect System. Revision "B". Teradyne. Aug. 23, 2005. 12 pages.
[No Author Listed], High Speed Backplane Connectors. Tyco Electronics. Product Catalog No. 1773095. Revised Dec. 1, 2008—40 pages.
[No Author Listed], HOZOX EMI Absorption Sheet and Tape. Molex. Laird Technologies. 2013. 2 pages.
[No Author Listed], INF-8074i Specification for SFP (Small Formfactor Pluggable) Transceiver. SFF Committee. Revision 1.0. May 12, 2001. 39 pages.
[No Author Listed], INF-8438i Specification for QSFP (Quad Small Formfactor Pluggable) Transceiver. Rev 1.0 Nov. 2006. SFF Committee. 76 pages.
[No Author Listed], Interconnect Signal Integrity Handbook. Samtec. Aug. 2007 21 pages.
[No Author Listed], Mcio 124pos 85ohm. Amphenol Assembletech. 1 page. URL:http://www.amphenol-ast.com/v3/en/overview.aspx?classId=234 [retrieved on Apr. 11, 2022].
[No Author Listed], Metallized Conductive Products: Fabric-Over-Foam, Conductive Foam, Fabric, Tape. Laird Technologies. 2003. 32 pages.
[No Author Listed], Metral® 2000 Series. FCI. 2001. 2 pages.
[No Author Listed], Metral® 2mm High-Speed Connectors 1000, 2000, 3000 Series. FCI. 2000. 119 pages.
[No Author Listed], Metral® 3000 Series. FCI. 2001. 2 pages.
[No Author Listed], Metral® 4000 Series. FCI. 2002. 2 pages.
[No Author Listed], Metral® 4000 Series: High-Speed Backplane Connectors. FCI, Rev. 3. Nov. 30, 2001. 21 pages.
[No Author Listed], Military Fibre Channel High Speed Cable Assembly. www.gore.com. 2008. [last accessed Aug. 2, 2012 via Internet Archive: Wayback Machine http://web.archive.org] Link archived: http://www.gore.com/en.sub.--xx/products/cables/copper/networking/militar-y/military.sub.--fibre . . . . Last archive date Apr. 6, 2008.
[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].
[No Author Listed], Mini Cool Edge IO Connector. Commercial IO. Amphenol ICC. 5 pages. URL:https://cdn.amphenol-icc.com/media/wysiwyg/files/documentation/datasheet/inputoutput/io_mini_cool_edge_io.pdf [retrieved on Apr. 11, 2022].
[No Author Listed], Molex Connectors as InfiniBand Solutions. Design World. Nov. 19, 2008. 7 pages. https://www.designworldonline.com/molex-connectors-as-infiniband-solutions/. [last accessed May 3, 2021].

(56) References Cited

OTHER PUBLICATIONS

[No Author Listed], OSFP MSA Specification for OSFP Octal Small Form Factor Pluggable Module. Revision 1.11. OSFP MSA. Jun. 26, 2017. 53 pages.
[No Author Listed], OSFP MSA Specification for OSFP Octal Small Form Factor Pluggable Module. Revision 1.12. OSFP MSA. Aug. 1, 2017. 53 pages.
[No Author Listed], OSFP MSA Specification for OSFP Octal Small Form Factor Pluggable Module. Revision 2.0 OSFP MSA. Jan. 14, 2019. 80 pages.
[No Author Listed], OSFP MSA Specification for OSFP Octal Small Form Factor Pluggable Module. Revision 3.0 OSFP MSA. Mar. 14, 2020. 99 pages.
[No Author Listed], Photograph of Molex Connector. Oct. 2021. 1 page.
[No Author Listed], Photograph of TE Connector. Oct. 2021. 1 page.
[No Author Listed], Pluggable Form Products. Tyco Electronics. Mar. 5, 2006. 1 page.
[No Author Listed], Pluggable Input/Output Solutions. Tyco Electronics Catalog 1773408-1. Revised Feb. 2009. 40 pages.
[No Author Listed], QSFP Market Evolves, First Products Emerge. Lightwave. Jan. 22, 2008. pp. 1-8. https://www.lightwaveonline.com/home/article/16662662.
[No Author Listed], QSFP-DD Hardware Specification for QSFP Double Density 8X Pluggable Transceiver, Rev 3.0. QSFP-DD MSA. Sep. 19, 2017. 69 pages.
[No Author Listed], QSFP-DD Hardware Specification for QSFP Double Density 8X Pluggable Transceiver, Rev 4.0. QSFP-DD MSA. Sep. 18, 2018. 68 pages.
[No Author Listed], QSFP-DD MSA QSFP-DD Hardware Specification for QSFP Double Density 8X Pluggable Transceiever. Revision 5.0. QSFP-DD-MSA. Jul. 9, 2019. 82 pages.
[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.
[No Author Listed], QSFP-DD MSA QSFP-DD Specification for QSFP Double Density 8X Pluggable Transceiver. Revision 1.0. QSFP-DD-MSA. Sep. 15, 2016. 69 pages.
[No Author Listed], QSFP-DD Specification for QSFP Double Density 8X Pluggable Transceiver Specification, Rev. 2.0. QSFP-DD MSA. Mar. 13, 2017. 106 pages.
[No Author Listed], RTP Company Introduces "Smart" Plastics for Bluetooth Standard. Press Release. RTP. Jun. 4, 2001. 2 pages.
[No Author Listed], RTP Company Specialty Compounds. RTP. Mar. 2002. 2 pages.
[No Author Listed], RTP Company-EMI/RFI Shielding Compounds (Conductive) Data Sheets. RTP Company. Last accessed Apr. 30, 2021. 4 pages.
[No Author Listed], Samtec Board Interface Guide. Oct. 2002. 253 pages.
[No Author Listed], SFF Committee SFF-8079 Specification for SFP Rate and Application Selection. Revision 1.7. SFF Committee. Feb. 2, 2005. 21 pages.
[No Author Listed], SFF Committee SFF-8089 Specification for SFP (Small Formfactor Pluggable) Rate and Application Codes. Revision 1.3. SFF Committee. Feb. 3, 2005. 18 pages.
[No Author Listed], SFF Committee SFF-8436 Specification for QSFP+ 4X 10 Gb/s Pluggable Transceiver. Revision 4.9. SFF Committee. Aug. 31, 2018. 88 pages.
[No Author Listed], SFF Committee SFF-8665 Specification for QSFP+ 28 Gb/s 4X Pluggable Transceiver Solution (QSFP28). Revision 1.9. SFF Committee. Jun. 29, 2015. 14 pages.
[No Author Listed], SFF-8075 Specification for PCI Card Version of SFP Cage. Rev 1.0. SFF Committee. Jul. 3, 2001. 11 pages.
[No Author Listed], SFF-8431 Specifications for Enhanced Small Form Factor Pluggable Module SFP+. Revision 4.1. SFF Committee. Jul. 6, 2009. 132 pages.
[No Author Listed], SFF-8432 Specification for SFP+ Module and Cage. Rev 5.1. SFF Committee. Aug. 8, 2012. 18 pages.
[No Author Listed], SFF-8433 Specification for SFP+ Ganged Cage Footprints and Bezel Openings. Rev 0.7. SFF Committee. Jun. 5, 2009. 15 pages.
[No Author Listed], SFF-8477 Specification for Tunable XFP for ITU Frequency Grid Applications. Rev 1.4. SFF Committee. Dec. 4, 2009. 13 pages.
[No Author Listed], SFF-8672 Specification for QSFP+ 4x 28 Gb/s Connector (Style B). Revision 1.2. SNIA. Jun. 8, 2018. 21 pages.
[No Author Listed], SFF-8679 Specification for QSFP+ 4X Base Electrical Specification. Rev 1.7. SFF Committee. Aug. 12, 2014. 31 pages.
[No Author Listed], SFF-8682 Specification for QSFP+ 4X Connector. Rev 1.1. SNIA SFF TWG Technology Affiliate. Jun. 8, 2018. 19 pages.
[No Author Listed], SFF-TA-1016 Specification for Internal Unshielded High Speed Connector System. Rev 0.0.1. SNIA SFF TWG Technology Affiliate. Nov. 15, 2019. 40 pages.
[No Author Listed], Shielding Theory and Design. Laird Technologies. Last accessed Apr. 30, 2021. 1 page.
[No Author Listed], Shielding Theory and Design. Laird Technologies. Last accessed Apr. 30, 2021. 2 pages. URL:web.archive.org/web/20030226182710/http://www.lairdtech.com/catalog/staticdata/shieldingtheorydesign/std_3.htm.
[No Author Listed], Shielding Theory and Design. Laird Technologies. Last accessed Apr. 30, 2021. 2 pages. URL:web.archive.org/web/20021223144443/http://www.lairdtech.com/catalog/staticdata/shieldingtheorydesign/std_2.htm.
[No Author Listed], Signal Integrity—Multi-Gigabit Transmission Over Backplane Systems. International Engineering Consortium. 2003;1-8.
[No Author Listed], Signal Integrity Considerations for 10Gbps Transmission over Backplane Systems. DesignCon2001. Teradyne Connections Systems, Inc. 2001. 47 pages.
[No Author Listed], Specification for OSFP Octal Small Form Factor Pluggable Module. Rev 1.0. OSFP MSA. Mar. 17, 2017. 53 pages.
[No Author Listed], TB-2092 GbX Backplane Signal and Power Connector Press-Fit Installation Process. Teradyne. Aug. 8, 2002;1-9.
[No Author Listed], Teradyne Beefs Up High-Speed GbX Connector Platform. EE Times. Sep. 20, 2005. 3 pages.
[No Author Listed], Teradyne Connection Systems Introduces the GbX L-Series Connector. Press Release. Teradyne. Mar. 22, 2004. 5 pages.
[No Author Listed], Teradyne Schematic, Daughtercard Connector Assembly 5 Pair GbX, Drawing No. C-163-5101-500. Nov. 6, 2002. 1 page.
[No Author Listed], Tin as a Coating Material. Brush Wellman Engineered Materials. Jan. 2002;4(2). 2 pages.
[No Author Listed], Two and Four Pair HM-Zd Connectors. Tyco Electronics. Oct. 14, 2003;1-8.
[No Author Listed], Tyco Electronics Schematic, Header Assembly, Right Angle, 4 Pair HMZd, Drawing No. C-1469048. Jan. 10, 2002. 1 page.
[No Author Listed], Tyco Electronics Schematic, Receptacle Assembly, 2 Pair 25mm HMZd, Drawing No. C-1469028. Apr. 24, 2002. 1 page.
[No Author Listed], Tyco Electronics Schematic, Receptacle Assembly, 3 Pair 25mm HMZd, Drawing No. C1469081. May 13, 2002. 1 page.
[No Author Listed], Tyco Electronics Schematic, Receptacle Assembly, 4 Pair HMZd, Drawing No. C1469001. Apr. 23, 2002. 1 page.
[No Author Listed], Tyco Electronics Z-Dok+ Connector. May 23, 2003. pp. 1-15. http://zdok.tycoelectronics.com.
[No Author Listed], Tyco Electronics, SFP System. Small Form-Factor Pluggable (SFP) System. Feb. 2001. 1 page.
[No Author Listed], Typical conductive additives—Conductive Compounds. RTP Company. https://www.rtpcompany.com/products/conductive/additives.htm. Last accessed Apr. 30, 2021. 2 pages.
[No Author Listed], Z-Pack HM-Zd Connector, High Speed Backplane Connectors. Tyco Electronics. Catalog 1773095. 2009;5-44.
[No Author Listed], Z-Pack HM-Zd: Connector Noise Analysis for XAUI Applications. Tyco Electronics. Jul. 9, 2001. 19 pages.

(56) References Cited

OTHER PUBLICATIONS

Atkinson et al., High Frequency Electrical Connector, U.S. Appl. No. 15/645,931, filed Jul. 10, 2017.
Beaman, High Performance Mainframe Computer Cables. 1997 Electronic Components and Technology Conference. 1997;911-7.
Chung, Electrical applications of carbon materials. J. of Materials Science. 2004;39:2645-61.
Dahman, Recent Innovations of Inherently Conducting Polymers for Optimal (106-109 Ohm/Sq) ESD Protection Materials. RTD Company. 2001. 8 pages.
Do et al., A Novel Concept Utilizing Conductive Polymers on Power Connectors During Hot Swapping in Live Modular Electronic Systems. IEEE Xplore 2005; downloaded Feb. 18, 2021;340-345.
Eckardt, Co-Injection Charting New Territory and Opening New Markets. Battenfeld GmbH. Journal of Cellular Plastics. 1987;23:555-92.
Elco, Metral® High Bandwidth—A Differential Pair Connector for Applications up to 6 GHz. FCI. Apr. 26, 1999;1-5.
Feller et al., Conductive polymer composites: comparative study of poly(ester)-short carbon fibres and poly(epoxy)-short carbon fibres mechanical and electrical properties. Materials Letters. Feb. 21, 2002;57:64-71.
Getz et al., Understanding and Eliminating EMI in Microcontroller Applications. National Semiconductor Corporation. Aug. 1996. 30 pages.
Grimes et al., A Brief Discussion of EMI Shielding Materials. IEEE. 1993:217-26.
Housden et al., Moulded Interconnect Devices. Prime Faraday Technology Watch. Feb. 2002. 34 pages.
Hsu, Compact Electrical Connector, U.S. Appl. No. 17/867,067, filed Jul. 18, 2022.
McAlexander, CV of Joseph C. McAlexander III . Exhibit 1009. 2021. 31 pages.
McAlexander, Declaration of Joseph C. McAlexander III in Support of Petition for Inter Partes Review of U.S. Pat. No. 10,381,767. Exhibit 1002. Nov. 4, 2021. 85 pages.
Nadolny et al., Optimizing Connector Selection for Gigabit Signal Speeds. Sep. 2000. 5 pages.
Neelakanta, Handbook of Electromagnetic Materials: Monolithic and Composite Versions and Their Applications. CRC. 1995. 246 pages.
Okinaka, Significance of Inclusions in Electroplated Gold Films for Electronics Applications. Gold Bulletin. Aug. 2000;33(4):117-127.
Ott, Noise Reduction Techniques In Electronic Systems. Wiley. Second Edition. 1988. 124 pages.
Patel et al., Designing 3.125 Gbps Backplane System. Teradyne. 2002. 58 pages.
Preusse, Insert Molding vs. Post Molding Assembly Operations. Society of Manufacturing Engineers. 1998. 8 pages.
Reich et al., Microwave Theory and Techniques. Boston Technical Publishers, Inc. 1965;182-91.
Ross, Focus on Interconnect: Backplanes Get Reference Designs. EE Times. Oct. 27, 2003 [last accessed Apr. 30, 2021]. 4 pages.
Ross, GbX Backplane Demonstrator Helps System Designers Test High-Speed Backplanes. EE Times. Jan. 27, 2004 [last accessed May 5, 2021]. 3 pages.
Sasame et al., Electrical connector with cavity between terminals, U.S. Appl. No. 17/942,435, filed Sep. 12, 2022.
Shi et al. Improving Signal Integrity in Circuit Boards by Incorporating Absorbing Materials. 2001 Proceedings. 51st Electronic Components and Technology Conference, Orlando FL. 2001:1451-56.
Silva et al., Conducting Materials Based on Epoxy/Graphene Nanoplatelet Composites With Microwave Absorbing Properties: Effect of the Processing Conditions and Ionic Liquid. Frontiers in Materials. Jul. 2019;6(156):1-9. doi: 10.3389/fmats.2019.00156.
Tracy, Rev. 3.0 Specification IP (Intellectual Property). Mar. 20, 2020. 8 pages.
Violette et al., Electromagnetic Compatibility Handbook. Van Nostrand Reinhold Company Inc. 1987. 229 pages.
Wagner et al., Recommended Engineering Practice to Enhance the EMI/EMP Immunity of Electric Power Systems. Electric Research and Management, Inc. Dec. 1992. 209 pages.
Weishalla, Smart Plastic for Bluetooth. RTP Imagineering Plastics. Apr. 2001. 7 pages.
White, A Handbook on Electromagnetic Shielding Materials and Performance. Don Whie Consultants. 1998. Second Edition. 77 pages.
White, EMI Control Methodology and Procedures. Don White Consultants, Inc. Third Edition 1982. 22 pages.
Williams et al., Measurement of Transmission and Reflection of Conductive Lossy Polymers at Millimeter-Wave Frequencies. IEEE Transactions on Electromagnetic Compatibility. Aug. 1990;32(3):236-240.

* cited by examiner

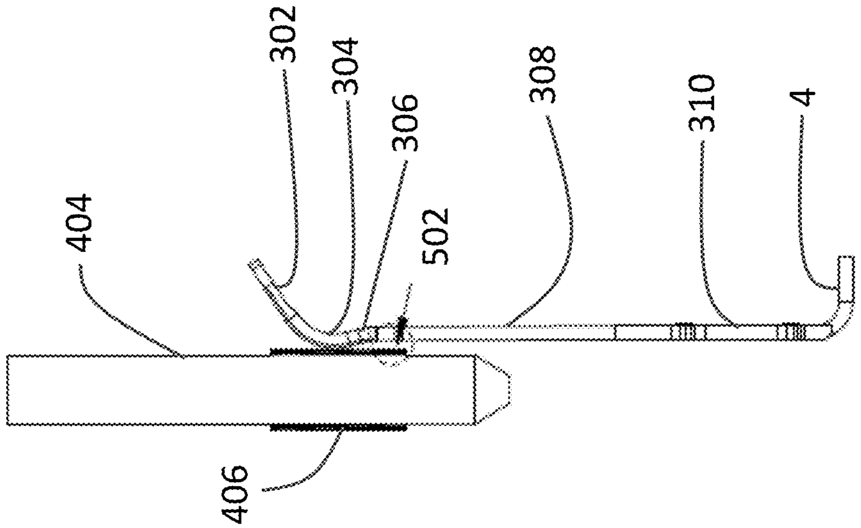
FIG. 5C
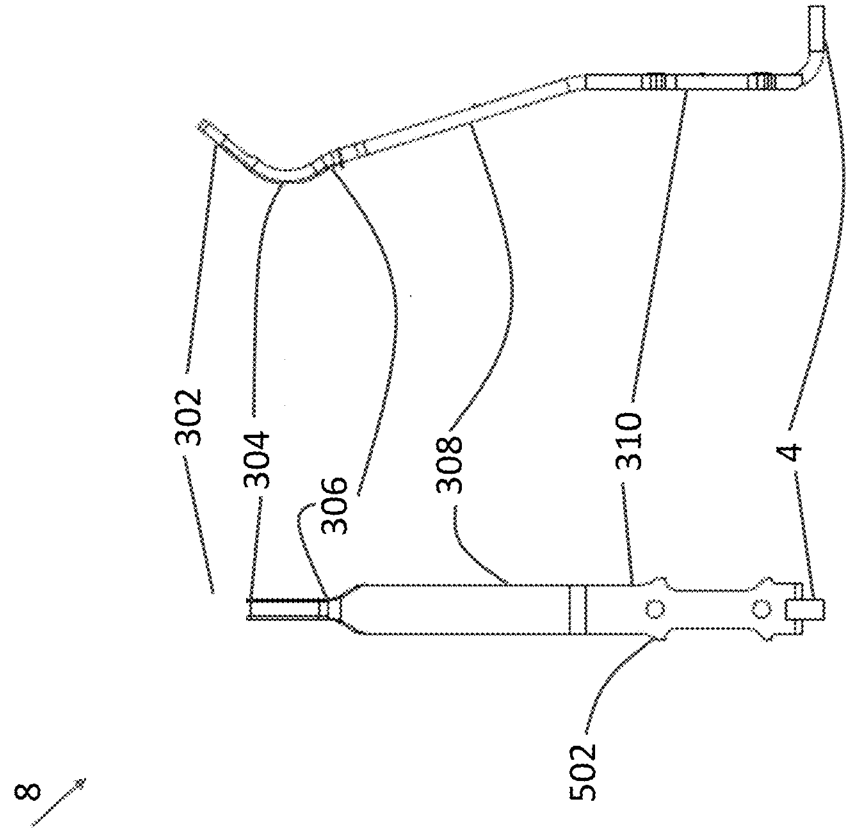
FIG. 5B
FIG. 5A

HIGH PERFORMANCE CARD EDGE CONNECTOR FOR HIGH BANDWIDTH TRANSMISSION

RELATED APPLICATIONS

This application claims priority to and the benefit of Chinese Patent Application Serial No. 202121908685.1, filed on Aug. 13, 2021, entitled "HIGH PERFORMANCE CARD EDGE CONNECTOR FOR HIGH-BANDWIDTH TRANSMISSION." The entire content of this application is incorporated herein by reference in its entirety.

TECHNICAL FIELD

The present disclosure relates to connectors, and in particular to a high performance card edge connector for high bandwidth transmission.

BACKGROUND

Electrical connectors are used in many ways within electronic systems and to connect different electronic systems together. For example, printed circuit boards (PCBs) can be electrically coupled using one or more electrical connectors, allowing individual PCBs to be manufactured for particular purposes and electrically coupled with a connector to form a desired system rather than manufacturing the entire system as a single assembly. One type of electrical connector is an "edge connector," which is a type of female connector that interfaces directly with conductive traces on or near the edge of a PCB without the need for a separate male connector because the PCB itself acts as the male connector that interfaces with the edge connector. In addition to providing electrical connections between a PCB and another electronic system, some edge connector may also provide mechanical support for the inserted PCB such that the PCB is held in a substantially immovable position relative to the other electronic system.

Some electrical connectors utilize differential signaling to transmit a signal from a first electronic system to a second electronic system. Specifically, a pair of conductors is used to transmit a signal. One conductor of the pair is driven with a first voltage and the other conductor is driven with a voltage complementary to the first voltage. The difference in voltage between the two conductors represents the signal. An electrical connector may include multiple pairs of conductors to transmit multiple signals. To control the impedance of these conductors and to reduce crosstalk between the signals, ground conductors may be included adjacent each pair of conductors.

As electronic systems have become smaller, faster and functionally more complex, both the number of circuits in a given area and the operational frequencies have increased. Consequently, the electrical connectors used to interconnect these electronic systems are required to handle the transfer of data at higher speeds without significantly distorting the data signals (via, e.g., cross-talk and/or interference) using electrical contacts that have a high density (e.g., a pitch less than 1 mm, where the pitch is the distance between adjacent electrical contacts within an electrical connector).

BRIEF SUMMARY

The present disclosure provides a high performance card edge connector for high bandwidth transmission.

Some embodiments relate to an electrical connector. The electrical connector may include a plurality of conductive elements each comprising a mating contact portion, a mounting contact portion opposite the mating contact portion, and an intermediate portion between the mating contact portion and the mounting contact portion, the plurality of conductive elements comprising a plurality of differential pairs of conductive elements; and an insulative housing holding the plurality of conductive elements, the insulative housing comprising a plurality of holes extending through the insulative housing, with holes of the plurality of holes disposed between the conductive elements of respective pairs of the plurality of differential pairs of conductive elements.

In some embodiments, the insulative housing may comprise a plurality of slots each holding a conductive element of the plurality of conductive elements. The plurality of holes may connect adjacent slots of the plurality of slots.

In some embodiments, the plurality of holes may be disposed between the mating contact portions of the conductive elements of respective pairs.

In some embodiments, the insulative housing may comprise a first portion, a second portion, and a separator between the first portion and the second portion. The second portion of the insulative housing may comprise the plurality of holes.

In some embodiments, the first portion of the insulative housing may comprise a first bottom portion that separates slots of the plurality of slots in the first portion of the insulative housing. The second portion of the insulative housing may comprise a second bottom portion that separates slots of the plurality of slots in the second portion of the insulative housing. The electrical connector may comprise a member comprising a bar adjacent the bottom of the second portion and a plurality of ribs disposed into selected slots of the slots of the plurality of slots in the second portion of the insulative housing.

In some embodiments, the plurality of holes may each extend through the insulative housing in a first direction. The plurality of slots may each extend through the insulative housing in a second direction perpendicular to the first direction.

In some embodiments, the intermediate portions of the plurality of conductive elements may each comprise a beam, a bearing portion between the beam and the mounting contact portion and fixed in the insulative housing, and a transition portion between the mating contact portion and the beam, the transition portion curved away from the mating contact portion.

In some embodiments, the mounting contact portions of the plurality of conductive elements may be L-shaped.

In some embodiments, the plurality of conductive elements may each comprise a tip extending from a respective mating contact portion and being thinner than the respective mating contact portions.

Some embodiments relate to an electrical connector. The electrical connector may include an insulative housing; and a plurality of conductive elements held by the insulative housing, the plurality of conductive elements each comprising a mating contact portion, a mounting contact portion opposite the mating contact portion, a beam, a bearing portion between the beam and the mounting contact portion and fixed in the insulative housing, and a transition portion between the mating contact portion and the beam. The transition portions may be curved such that gaps exist between a mating board and the beams of the plurality of conductive elements and the beams of the plurality of conductive elements are in parallel with a surface of the mating board.

In some embodiments, the plurality of conductive elements may each comprise a tip extending from a respective mating contact portion and being thinner than the respective mating contact portions.

In some embodiments, for each of the plurality of conductive elements, the bearing portion may comprise a plurality of barbs in the insulative housing such that the bearing portion is fixed in the insulative housing and the tip is thinner than the respective mating contact portion.

In some embodiments, the plurality of conductive elements may comprise a plurality of differential pairs of signal conductive elements and a plurality of reference conductive elements disposed between the differential pairs. The plurality of conductive elements may be identical.

In some embodiments, for each of the plurality of conductive elements, the mating contact portion may be narrower than the beam.

In some embodiments, for each of the plurality of conductive elements, the mounting contact portion may be narrower than the bearing portion.

In some embodiments, the plurality of conductive elements may comprise a plurality of differential pairs of conductive elements. The insulative housing may comprise a plurality of holes extending therethrough. The plurality of holes may be disposed between the conductive elements of respective pairs of the plurality of differential pairs of conductive elements.

In some embodiments, the insulative housing may comprise a plurality of slots each holding a conductive element of the plurality of conductive elements. The plurality of slots may extend through the insulative housing. The insulative housing may comprise a bottom portion that separates the plurality of slots from each other. The electrical connector may comprise a member comprising a bar adjacent the bottom portion of the insulative housing and a plurality of ribs extending from the bar to selected slots of the plurality of slots of the insulative housing.

Some embodiments relate to an electrical connector. The electrical connector may include a plurality of conductive elements each comprising a mating contact portion, a mounting contact portion opposite the mating contact portion, a beam, and a bearing portion between the beam and the mounting contact portion and fixed in the insulative housing; an insulative housing comprising a plurality of slots each holding a conductive element of the plurality of conductive elements; and a member attached to the insulative housing, the member comprising a bar and a plurality of ribs extending perpendicular to the bar and into selected slots of the plurality of slots, the plurality of ribs contacting the bearing portions of the conductive elements in the selected slots of the plurality of slots, wherein the member is at least partially conductive.

In some embodiments, the insulative housing may comprise a first portion and a second portion separated from each other by a separator. The member may be attached to the second portion of the insulative housing.

In some embodiments, the first portion of the insulative housing may have a first bottom portion. The second portion of the insulative housing may have a second bottom portion. The member may be attached to the second bottom portion and may be flush with the first bottom portion.

Some embodiments relate to a high performance card edge connector for high bandwidth transmission. The connector may include a housing formed with a bar-shaped groove that opens at an upper end thereof, wherein several slots for placing terminals are formed in opposing walls of the housing with lower ends of the slots extending through a lower end of the housing; an end of each terminal may be formed with an arc-shaped contact face and protrude toward the groove; a lower end of each of the terminals may be formed with an L-shaped mounting contact portion extending out of the lower end of the housing; and several air holes may be formed in the opposing walls of the housing.

In some embodiments, a bar may be inserted from a lower end of the housing, several ribs may be provided on both sides of the bar, the ribs may be pressed against surfaces of the terminals.

In some embodiments, a retention edge may be formed at upper ends of the slots, and the upper end of each terminal may be disposed between the retention edge and the respective slot.

In some embodiments, the end of each terminal may comprise a trapezoidal tip structure.

In some embodiments, a positioning post may be provided on the lower surface of the housing at opposite ends.

In some embodiments, a fixing lug may be provided at each of the opposite ends of the housing, a T-shaped slot may be provided at a side of each fixing lug, and a fixing piece may be inserted into each T-shaped slot.

In some embodiments, the fixing piece may be of an L-shaped structure, and a lower end of the fixing piece may comprise a through hole.

In some embodiments, several air holes may be uniformly arranged along a length direction of the housing, and the height of each air hole may correspond to the height of the contact faces of the terminals.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, identical or nearly identical components that are illustrated in various figures may be represented by a like numeral. For purposes of clarity, not every component may be labeled in every drawing. In the drawings:

FIG. 5A is a front perspective view of a terminal of the card edge connector of FIG. 1A, according to some embodiments.

FIG. 5B is a side perspective view of the terminal of FIG. 5A in a free state, according to some embodiments.

FIG. 5C is a side perspective view the terminal of FIG. 5A in a mated state, according to some embodiments.

DETAILED DESCRIPTION

Figure 1A:
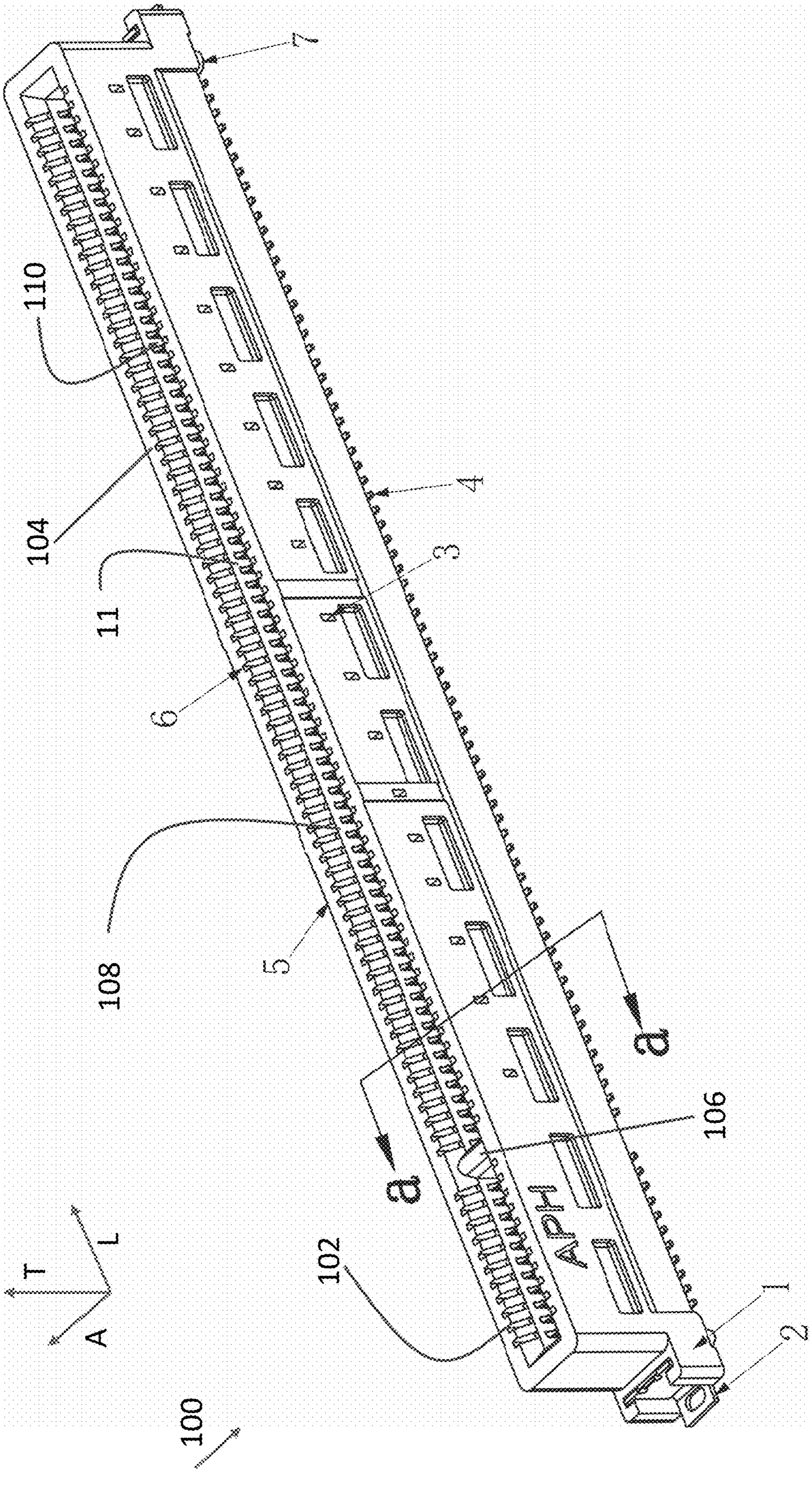
FIG. 1A is a top perspective view of a card edge connector, according to some embodiments.
Figure 1B:
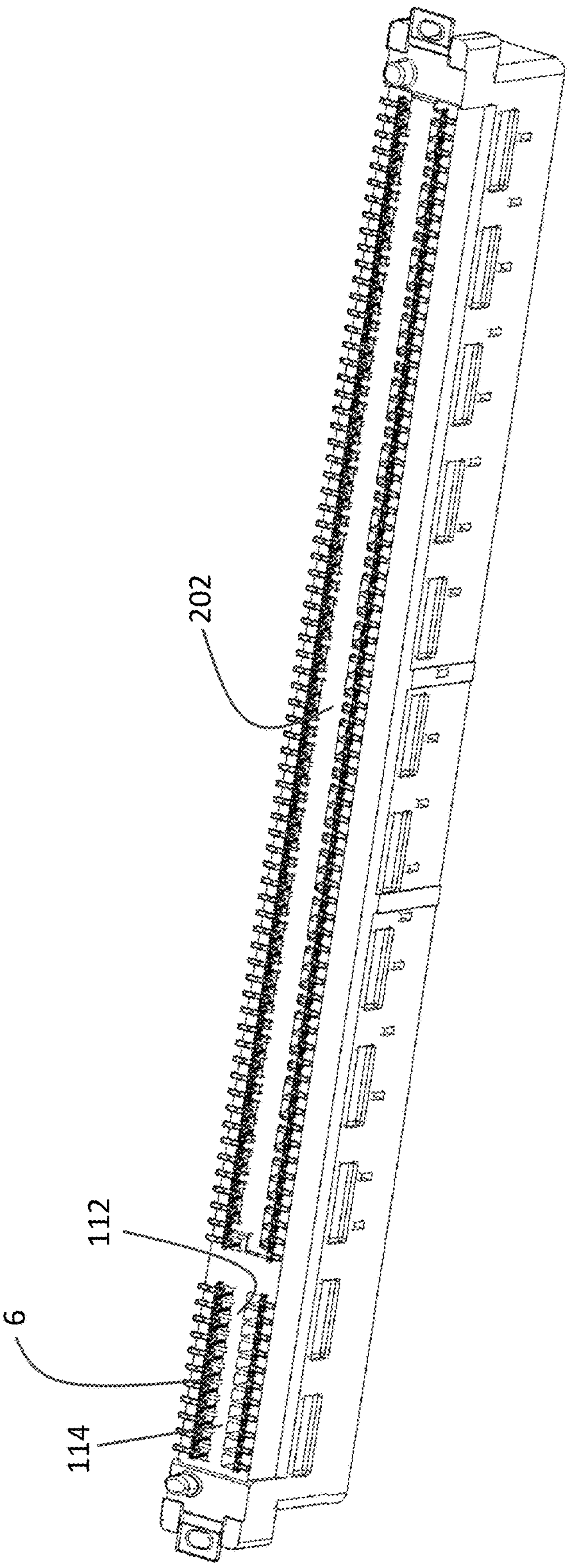
FIG. 1B is a bottom perspective view of the card edge connector of FIG. 1A.
Figure 2A:
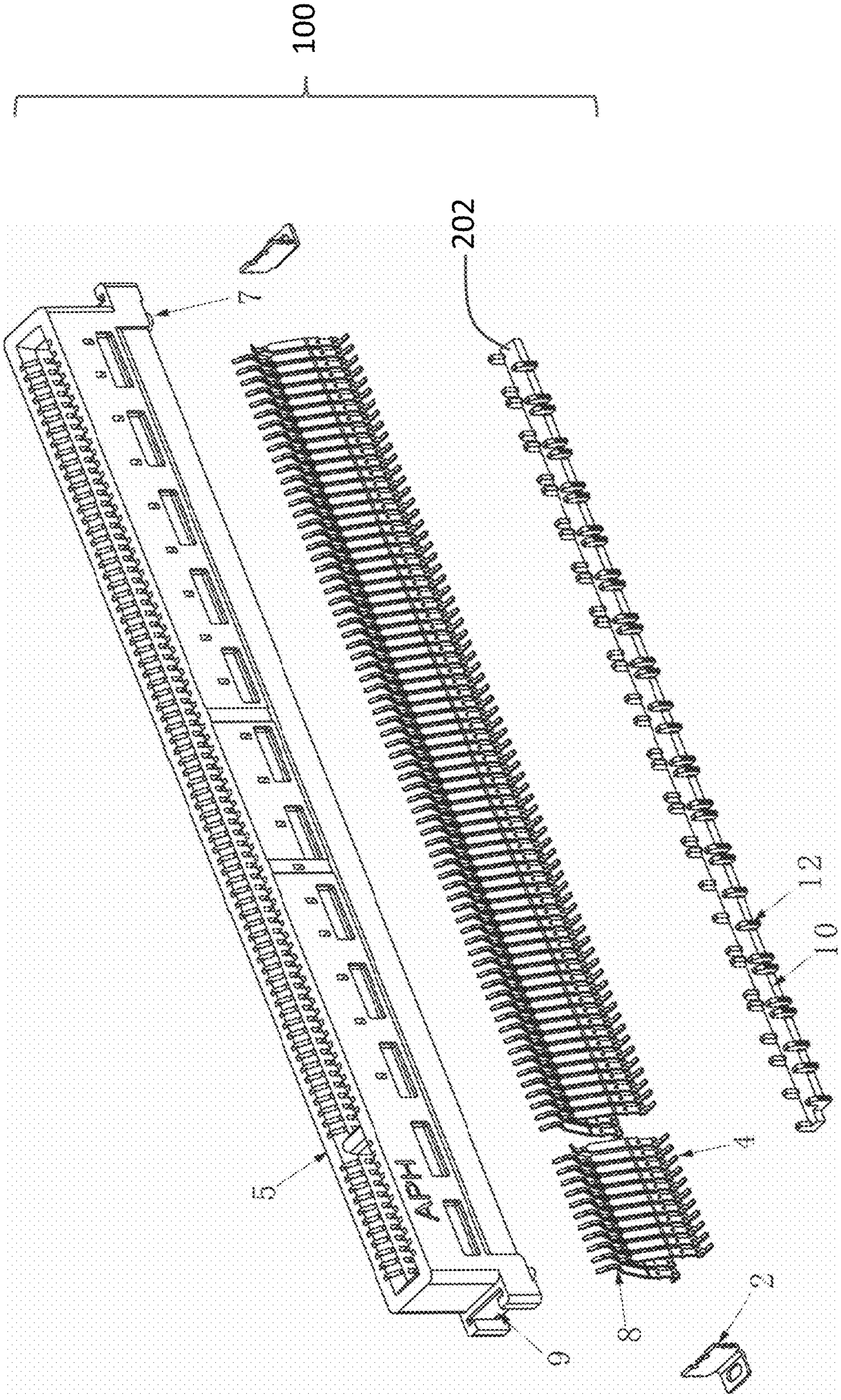
FIG. 2A is an exploded view of the card edge connector of FIG. 1A.
Figure 2B:
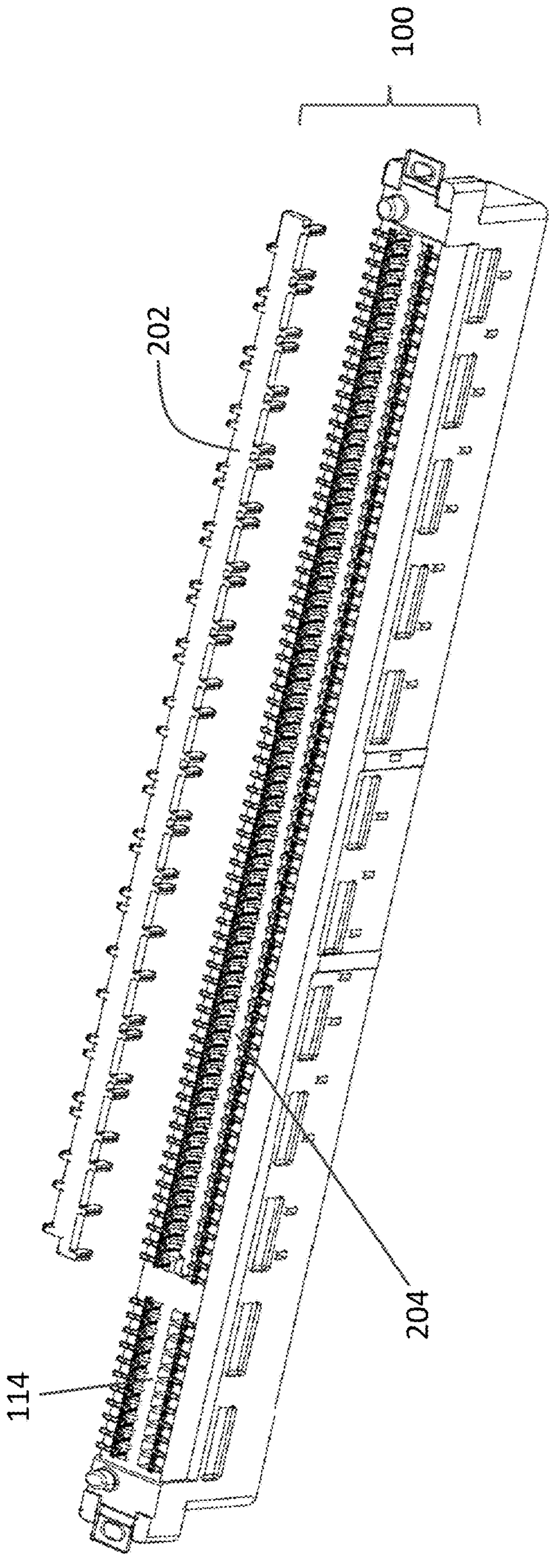
FIG. 2B is a partially exploded view of the card edge connector of FIG. 1B.

The inventors have recognized and appreciated connector design techniques that satisfy electrical and mechanical requirements to support greater bandwidth while providing flexibility to be compatible with earlier industrial standards. The inventors have recognized and appreciated that the impedance of a conventional connector may be disrupted at a mating interface where the connector's terminals mate with complementary electrical components. The inventors have recognized and appreciated that the disruption to a connector's impedance may be reduced by introducing, at selected locations adjacent the mating interface, a material having a suitable dielectric constant value. Such a configuration may reduce impedance mismatch at the mating interface and therefore improve signal integrity. The inventors have also recognized and appreciated that thinning tips of the terminal may enable shortening the tips and therefore reduce stubs caused by the tips, which improves connector signal integrity. The inventors have further recognized that having a removable lossy member configured to electrically connect selected terminals enables the connector to support greater bandwidth. These techniques, used alone or in any suitable combination, also enable the connector to mate with and provide electrical connection for electrical components manufactured according to earlier industrial standards.

An electrical connector may have terminals held by a housing. The housing may include two walls extending along a longitudinal direction, and a groove between the two walls and configured to receive a printed circuit board such as a daughter card. The walls may include slots facing the groove and extending in a transverse direction perpendicular to the longitudinal direction. The slots may each hold a terminal. The housing may include a bottom portion that may separate the slots from each other so as to provide isolation among the terminals in the slots. The housing may include a retention edge having protrusions projecting into the slots and configured to support tips of the terminals so as to preload the terminals.

The terminals may each have a mating contact portion curving into the groove and configured for contacting pads on the card inserted in the groove. Each terminal may have a tip extending from the mating contact portion and resting on a respective protrusion of the housing. Each terminal may have a mounting contact portion opposite the mating contact portion and configured for mounting the connector to another electrical component, such as a mother board. Each terminal may also have a bearing portion extending from the mounting contact portion and fixed in the housing, and a beam extending from the bearing portion. The beam may be configured to flex when the mating contact portion contacts a pad on a card. Each terminal may also have a curved transition portion between the mating contact portion and the beam, which may create a gap between the beam and the card inserted in the groove and enable the beams of the plurality of conductive elements to be in parallel with a surface of the mating board. This configuration prevents the beam from touching the card.

A material different from the housing material may be introduced at selected locations adjacent the mating interface. In some embodiments, the housing may include holes extending through the walls in a lateral direction perpendicular to the longitudinal direction and the transverse direction. The holes may be disposed between mating contact portions of selected adjacent terminals such as signal terminals. Since air has a lower dielectric constant than the housing material, such a configuration may reduce impedance mismatch at the mating interface and therefore improve signal integrity. In some embodiments, the holes may be filled with a material having a desired dielectric constant.

A member may be removably attached to the bottom portion of the connector housing. The member may have a bar extending in the longitudinal direction, and ribs extending from the sides of the bar in the transverse direction. The ribs are configured for contacting the bearing portions of terminals selected for reference such that the selected terminals are electrically connected to each other. Such a configuration may reduce crosstalk and improve signal integrity. Depending on the desired application, the member may be removed, and the terminals may be reassigned for different purposes.

Figure 4B:
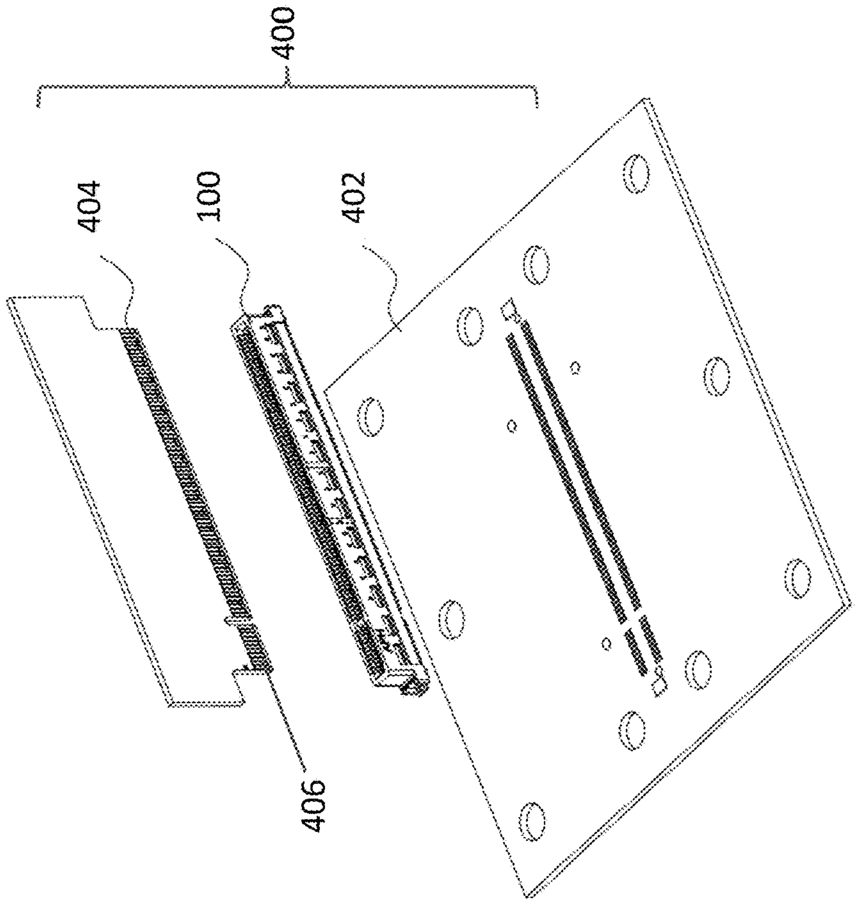
FIG. 4B is an exploded view of the electrical system of FIG. 4A.
Figure 4A:
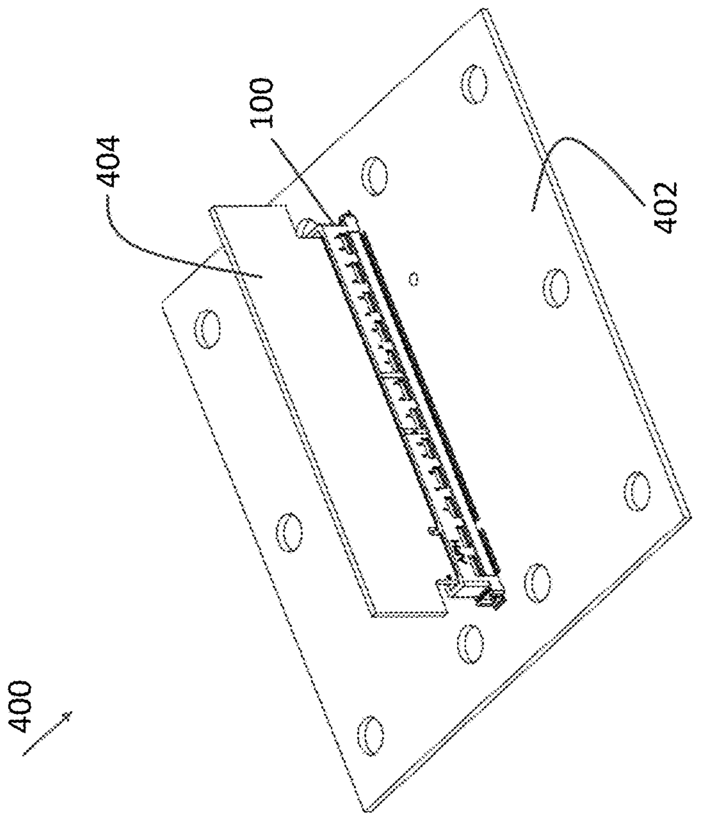
FIG. 4A is an electrical system comprising the card edge connector of FIG. 1A, according to some embodiments.

FIGS. 1A-2B illustrate a card edge connector 100, according to some embodiments. The card edge connector 100 may include terminals 8 and a housing 5 holding the terminals. The housing 5 may include walls 108 extending along a longitudinal direction (L) and a groove 110 between the walls 108. The groove 110 may receive a mating component such as a daughter card 404 as shown in FIGS. 4A-4B. The groove 110 may be bar-shaped and open at an upper end of the housing 5. Slots 6 may be formed in the opposing walls 108 with lower ends of the slots 6 extending through a bottom portion 112 of the housing 5 and separated from each other by the bottom portion 112. Positioning posts 7 may be provided on the lower surface of the housing 5 at opposite ends, which may facilitate mounting the connector 100 to another electrical component, such as a mother board 402 as shown in FIGS. 4A-4B. Fixing lugs 1 may be provided at opposite ends of the housing 5. Each fixing lug 1 may have a T-shaped slot 9 holding a fixing piece 2 inserted therein. The fixing piece 2 may be L-shaped and has a through hole.

The housing 5 may be separated into multiple portions. In the illustrated example, the housing 5 is separated into a first portion 102 and a second portion 104 by a separator [6] 106. Correspondingly, the bottom portion 112 may be separated into a first bottom portion 114 and a second bottom portion 204. A member 202 may be movably installed to one or more portion of the bottom portion 112 of the housing 5. In the illustrated example, the member is attached to the second bottom portion 204 of the housing 5. The member 202 has a bar 10 extending in the longitudinal direction, and ribs 12 extending from the sides of the bar 10 and in the transverse direction. The bar 10 of the member 202 may be flush with the first bottom portion 114. The ribs 12 may extend into selected ones of the slots 6. The ribs 12 may press against the selected terminals 8, which may secure the terminals 8 in position.

As illustrated, the terminals 8 may be configured the same. Such a configuration enables reconfiguration of the functions of the terminals according to the desired application. For example, when the member 202 is not installed, the terminals 8 may be configured to support earlier standards such as Peripheral Component Interconnect express (PCIe) Card Electromechanical specification (CEM); when the member 202 is installed, the terminals may be configured to support higher bandwidth transmission.

Figure 6:
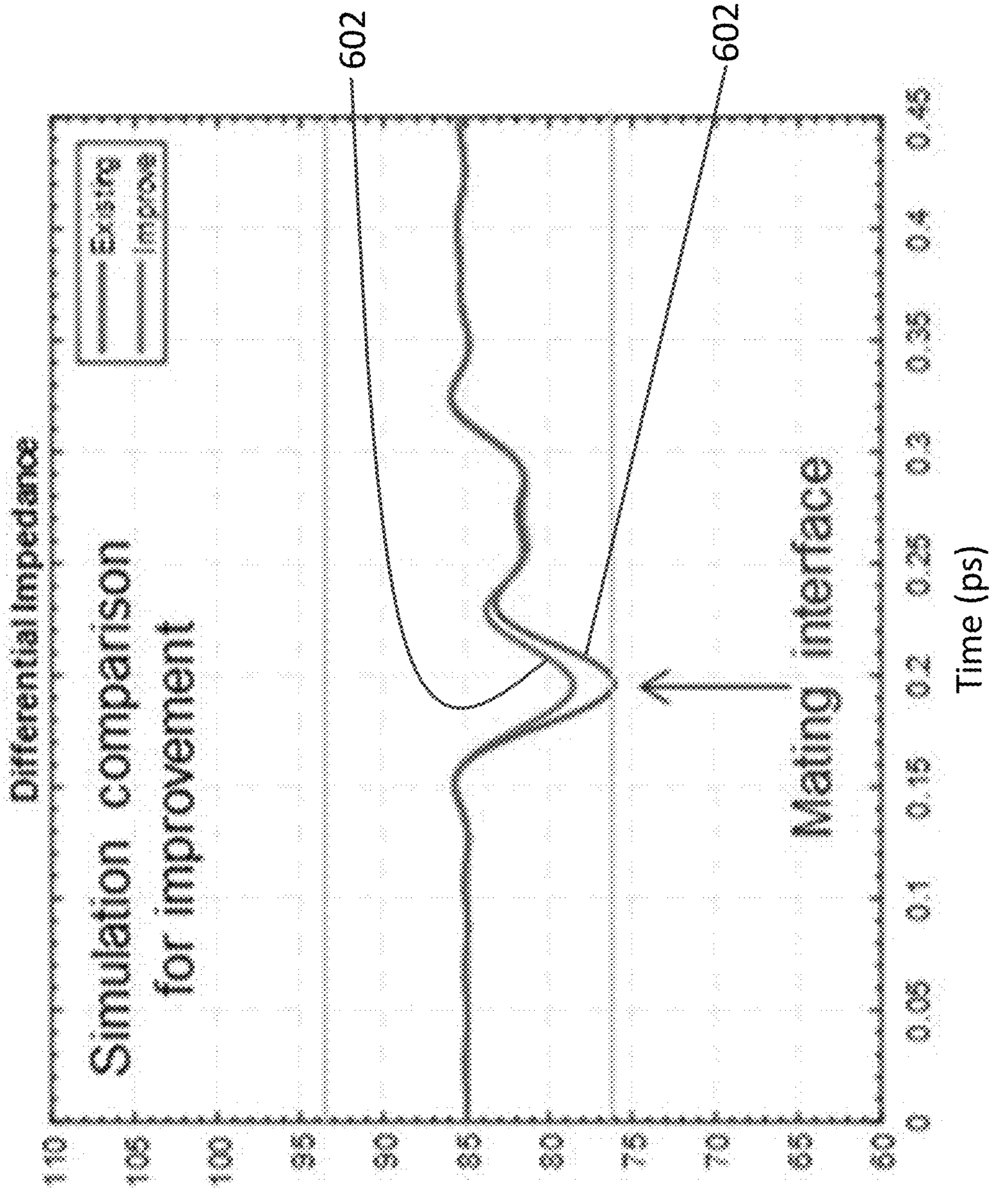
FIG. 6 is a schematic illustrating a simulation result of a differential impedance along a path from a contact pad of a printed circuit board to a terminal of the connector of FIG. 1A, compared with a simulation result of a differential impedance along a similar path for an existing connector.

The connector may include holes 3 at selected locations adjacent the mating interface. Since air has a lower dielectric constant than the housing material, such a configuration may reduce impedance mismatch at the mating interface and therefore improve signal integrity. FIG. 6 shows a simulation result 602 of a differential impedance along a path from the contact pad 406 of the card 404 to a terminal 8 of the connector 100, compared with a simulation result 604 of a differential impedance along a similar path for an existing connector. The result 602 shows increased impedance at the mating interface than the result 604 of the existing connector. It should also be appreciated that a different material may be introduced at selected locations adjacent the mating interface. In some embodiments, the holes may be filled with a material having a desired dielectric constant.

Figure 3:
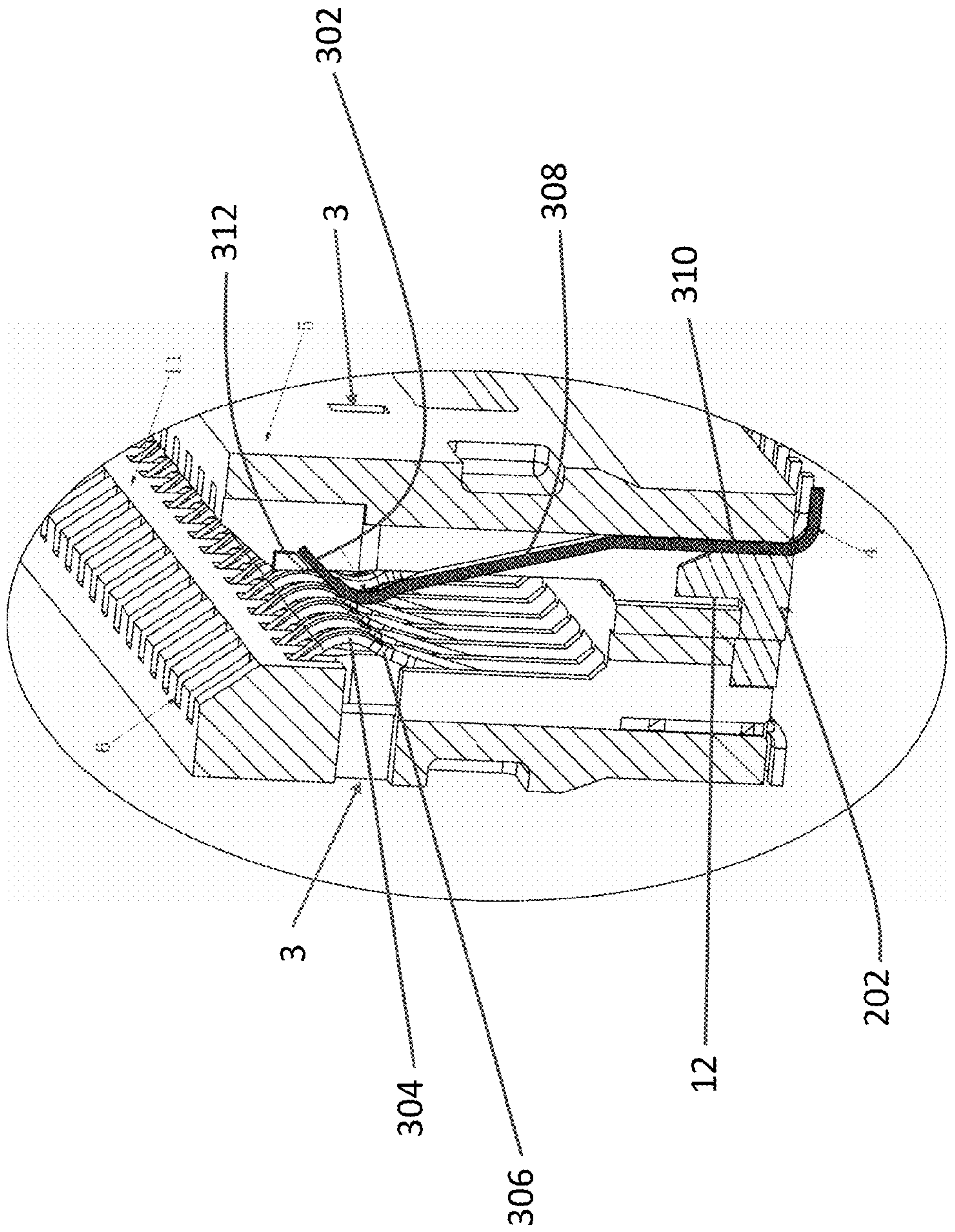
FIG. 3 is a cross-sectional view of the card edge connector of FIG. 1A along the line marked "a-a" in FIG. 1A.

FIG. 3 illustrates a cross-sectional view of the card edge connector 100 along the line marked "a-a" in FIG. 1A. FIG. 5A illustrates a front perspective view of a terminal 8 of the card edge connector 100. FIG. 5B and FIG. 5C illustrate side perspective views of the terminal 8 in a free state and a mated state, respectively. As illustrated, the terminals 8 may each have a mating contact portion 304 curving into the groove 110 and configured for contacting pads on the card inserted in the groove (e.g., pads 406 on the card 404). The holes 3 may be disposed between mating contact portions 304 of terminals 8, for example, between a pair of terminals 8 configured for differential signals. As illustrated in FIG. 3, a hole 3 may connect two adjacent slots 6 that may hold the pair of terminals 8.

Each terminal 8 may have a tip 302 extending from the mating contact portion. The housing 5 may include an extension edge 11 having protrusions 312 projecting into respective slots 6. The protrusions 312 may have slanted surfaces, on which the tips of the terminals 8 held in respective slots 6 may rest. The tip 302 may be thinner than the mating contact portion. Thinning the tips 302 of the terminals 8 may enable the tips 302 to rest on the slanted surfaces of the protrusions 312 of the housing 5, without additional portions that extend beyond the slanted surfaces and hook to the straight surfaces of the protrusions like conventional designs. Such a configuration enables the tips 302 of the terminals 8 to be shorter and therefore reduce stubs caused by the tips 302, which improves connector signal integrity.

Each terminal 8 may have a mounting contact portion 4 opposite the mating contact portion 304 and configured for mounting the connector 100 to another electrical component, such as a mother board 402 as shown in FIGS. 4A-4B. The mating contact portion 4 may be L-shaped and extend out of the bottom portion 112 of the housing 5.

Each terminal 8 may have a bearing portion 310 extending from the mounting contact portion. The bearing portion 310 may have barbs 502 extending outwardly from the sides so as to fit in features of the housing 5. The ribs 12 of the member 202 may contact the bearing portions 310 of the terminals 8 held in the selected ones of the slots 6. The member 202 may be made of material that is electrically conductive or lossy such that the selected terminals 8 are electrically coupled through the member 202.

Each terminal 8 may have a beam 308 extending from the bearing portion 310. The beam 308 may be configured to flex when the mating contact portion 340 contacts a pad on a card. Each terminal 8 may also have a transition portion 306 between the mating contact portion 304 and the beam 308. The transition portion 306 may curve away from the groove 110. Such a configuration may create a gap 502 between the beam 308 and the card 404 inserted in the groove 110 and enable the beams 308 to be in parallel with a surface of the card 404. This configuration prevents the beam 308 from touching the card 404.

In some embodiments, a connector housing such as the housing 5 may be dielectric members molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

In some embodiments, conductive elements such as terminals 8 may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

Materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within ground structures of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz. Alternatively, lossy material may be identified from measurements made at a single frequency, such as 15 GHz.

Loss may result from interaction of an electric field component of electromagnetic energy with the material, in which case the material may be termed electrically lossy. Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The "electric loss tangent" is the ratio of the imaginary part to the real part of the complex electrical permittivity of the material.

Electrically lossy materials can also be formed from materials that are generally thought of as conductors, but are relatively poor conductors over the frequency range of interest. These materials may conduct, but with some loss, over the frequency range of interest such that the material conducts more poorly than a conductor of an electrical connector, but better than an insulator used in the connector. Such materials may contain conductive particles or regions that are sufficiently dispersed that they do not provide high conductivity or otherwise are prepared with properties that lead to a relatively weak bulk conductivity compared to a good conductor such as copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000 Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy member need not have uniform properties over its entire volume. A lossy member, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy member may be formed by molding or otherwise shaping the binder with filler into a desired form. The lossy material may be molded over and/or through openings in conductors, which may be ground conductors or shields of the connector. Molding lossy material over or through openings in a conductor may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two shot molding operation. The lossy material may press against or be positioned sufficiently near a ground conductor that there is appreciable coupling to a ground conductor. Intimate contact is not a requirement for electrical coupling between lossy material and a conductor, as sufficient electrical coupling, such as capacitive coupling, between a lossy member and a conductor may yield the desired result. For example, in some scenarios, 100 pF of coupling between a lossy member and a ground conductor may provide an appreciable impact on the suppression of resonance in the ground conductor. In other examples with frequencies in the range of approximately 10 GHz or higher, a reduction in the amount of electromagnetic energy in a conductor may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to a conductor, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical lossy magnetic materials or mixtures containing lossy magnetic materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

Lossy portions also may be formed in a number of ways. In some examples the binder material, with fillers, may be molded into a desired shape and then set in that shape. In other examples the binder material may be formed into a sheet or other shape, from which a lossy member of a desired shape may be cut. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

Although details of specific configurations of conductive elements and housings are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Furthermore, although many inventive aspects are shown and described with reference to a plug connector having a right angle configuration, a receptacle connector, and card edge connectors, it should be appreciated that aspects of the present disclosure is not limited in this regard, as any of the inventive concepts, whether alone or in combination with one or more other inventive concepts, may be used in other types of electrical connectors, such as backplane connectors, stacking connectors, mezzanine connectors, I/O connectors, chip sockets, etc.

In some embodiments, mounting ends were illustrated as surface mount elements that are designed to fit within pads of printed circuit boards. However, other configurations may also be used, such as press fit "eye of the needle" compliant sections, spring contacts, solderable pins, etc.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. An electrical connector, comprising:
a plurality of conductive elements each comprising a mating contact portion, a mounting contact portion opposite the mating contact portion, and an intermediate portion between the mating contact portion and the mounting contact portion, the plurality of conductive elements comprising a plurality of differential pairs of conductive elements; and
an insulative housing holding the plurality of conductive elements, the insulative housing comprising a plurality of holes extending through the insulative housing, wherein, for each pair of the plurality of differential pairs of conductive elements:
a hole of the plurality of holes is disposed between the conductive elements of the pair.

2. The electrical connector of claim 1, wherein:
the insulative housing comprises a plurality of slots each holding a conductive element of the plurality of conductive elements, and
the plurality of holes connect adjacent slots of the plurality of slots.

3. The electrical connector of claim 2, wherein:
the plurality of holes each extends through the insulative housing in a first direction, and
the plurality of slots each extends through the insulative housing in a second direction perpendicular to the first direction.

4. The electrical connector of claim 1, wherein:
the plurality of holes are disposed between the mating contact portions of the conductive elements of respective pairs.

5. The electrical connector of claim 2, wherein:
the insulative housing comprises a first portion, a second portion, and a separator between the first portion and the second portion, and
the second portion of the insulative housing comprises the plurality of holes.

6. The electrical connector of claim 5, wherein:
the first portion of the insulative housing comprises a first bottom portion that separates slots of the plurality of slots in the first portion of the insulative housing,
the second portion of the insulative housing comprises a second bottom portion that separates slots of the plurality of slots in the second portion of the insulative housing,
the electrical connector comprises a member comprising a bar adjacent the bottom of the second portion and a plurality of ribs disposed into selected slots of the slots of the plurality of slots in the second portion of the insulative housing.

7. The electrical connector of claim 1, wherein:
the intermediate portions of the plurality of conductive elements each comprises a beam, a bearing portion between the beam and the mounting contact portion and fixed in the insulative housing, and a transition portion between the mating contact portion and the beam, the transition portion curved away from the mating contact portion.

8. The electrical connector of claim 1, wherein:
the mounting contact portions of the plurality of conductive elements are L-shaped.

9. The electrical connector of claim 1, wherein:
the plurality of conductive elements each comprises a tip extending from a respective mating contact portion and being thinner than the respective mating contact portions.

10. An electrical connector, comprising:
an insulative housing; and
a plurality of conductive elements held by the insulative housing, the plurality of conductive elements each comprising a mating contact portion, a mounting contact portion opposite the mating contact portion, a beam, a bearing portion between the beam and the mounting contact portion and fixed in the insulative housing, and a transition portion between the mating contact portion and the beam,
wherein the transition portions are curved such that gaps exist between a mating board and the beams of the plurality of conductive elements and the beams of the plurality of conductive elements are in parallel with a surface of the mating board.

11. The electrical connector of claim 10, wherein:
the plurality of conductive elements each comprises a tip extending from a respective mating contact portion and being thinner than the respective mating contact portions.

12. The electrical connector of claim 11, wherein for each of the plurality of conductive elements:
the bearing portion comprises a plurality of barbs in the insulative housing such that the bearing portion is fixed in the insulative housing and the tip is thinner than the respective mating contact portion.

13. The electrical connector of claim 10, wherein:
the plurality of conductive elements comprise a plurality of differential pairs of signal conductive elements and a plurality of reference conductive elements disposed between the differential pairs, and
the plurality of conductive elements are identical.

14. The electrical connector of claim 10, wherein for each of the plurality of conductive elements:
the mating contact portion is narrower than the beam.

15. The electrical connector of claim 10, wherein for each of the plurality of conductive elements:
the mounting contact portion is narrower than the bearing portion.

16. The electrical connector of claim 10, wherein:
the plurality of conductive elements comprise a plurality of differential pairs of conductive elements,
the insulative housing comprises a plurality of holes extending therethrough, and
the plurality of holes are disposed between the conductive elements of respective pairs of the plurality of differential pairs of conductive elements.

17. The electrical connector of claim 10, wherein:
the insulative housing comprises a plurality of slots each holding a conductive element of the plurality of conductive elements,
the plurality of slots extend through the insulative housing,
the insulative housing comprise a bottom portion that separates the plurality of slots from each other, and
the electrical connector comprises a member comprising
a bar adjacent the bottom portion of the insulative housing and
a plurality of ribs extending from the bar to selected slots of the plurality of slots of the insulative housing.

18. An electrical connector, comprising:
a plurality of conductive elements each comprising a mating contact portion, a mounting contact portion opposite the mating contact portion, a beam, and a bearing portion between the beam and the mounting contact portion;
an insulative housing comprising a first portion, a second portion, a separator separating the second portion from the first portion, and a plurality of slots each holding a conductive element of the plurality of conductive elements; and
a member attached to the second portion of the insulative housing, the member comprising a bar and a plurality of ribs extending perpendicular to the bar and into selected slots of the plurality of slots, the plurality of ribs contacting the bearing portions of the conductive elements in the selected slots of the plurality of slots, wherein the member is at least partially conductive,
wherein the bearing portion is fixed in the insulative housing.

19. The electrical connector of claim 18, wherein:
the plurality of conductive elements comprise a plurality of differential pairs of conductive elements;
the insulative housing comprise a plurality of holes, and
for each pair of the plurality of differential pairs of conductive elements, a hole of the plurality of holes is disposed between the conductive elements of the pair.

20. The electrical connector of claim 18, wherein:
the first portion of the insulative housing has a first bottom portion,
the second portion of the insulative housing has a second bottom portion,
the member is attached to the second bottom portion and is flush with the first bottom portion.

* * * * *